US012374271B2

(12) United States Patent
Zhai

(10) Patent No.: US 12,374,271 B2
(45) Date of Patent: Jul. 29, 2025

(54) DISPLAY PANEL AND DISPLAY DEVICE

(71) Applicant: TIANMA ADVANCED DISPLAY TECHNOLOGY INSTITUTE (XIAMEN) CO., LTD., Xiamen (CN)

(72) Inventor: Yingteng Zhai, Xiamen (CN)

(73) Assignee: TIANMA ADVANCED DISPLAY TECHNOLOGY INSTITUTE (XIAMEN) CO., LTD., Xiamen (CN)

( * ) Notice: Subject to any disclaimer, the term of this patent is extended or adjusted under 35 U.S.C. 154(b) by 0 days.

(21) Appl. No.: 18/508,240

(22) Filed: Nov. 14, 2023

(65) Prior Publication Data

US 2024/0087509 A1 Mar. 14, 2024

(30) Foreign Application Priority Data

Jun. 30, 2023 (CN) ......................... 202310802277.5

(51) Int. Cl.
*G09G 3/32* (2016.01)

(52) U.S. Cl.
CPC ........... *G09G 3/32* (2013.01); *G09G 2310/08* (2013.01); *G09G 2320/0233* (2013.01); *G09G 2320/0626* (2013.01)

(58) Field of Classification Search
None
See application file for complete search history.

(56) References Cited

U.S. PATENT DOCUMENTS

2024/0054936 A1* 2/2024 Azizi .................. G09G 3/2085

* cited by examiner

*Primary Examiner* — Duane N Taylor, Jr.
(74) *Attorney, Agent, or Firm* — KILPATRICK TOWNSEND & STOCKTON LLP

(57) ABSTRACT

A display panel and a display device are provided. One screen display period of the display panel includes N subframes. At least one of the N subframe serves as a target subframe. The display panel at least includes a first partition and a second partition. The partition includes at least one pixel circuit. In the target subframe, a p-th enabling level pulse of a light-emitting control signal received by a pixel circuit in the first partition and a q-th enabling level pulse of a light-emitting control signal received by a pixel circuit in the second partition overlap at least partially in time. p≠q, 1≤p≤M, 1≤q≤M, and p and q are integers.

20 Claims, 18 Drawing Sheets

DISPLAY PANEL AND DISPLAY DEVICE

The present application claims priority to Chinese Patent Application No. 202310802277.5, titled "DISPLAY PANEL AND DISPLAY DEVICE", filed on Jun. 30, 2023 with China National Intellectual Property Administration, which is incorporated herein by reference in its entirety.

FIELD

The present disclosure relates to the field of display technology, and in particular to a display panel and a display device.

BACKGROUND

With the development of display technology, people have increasing requirements on display devices. Among various display technologies, self-light-emitting display panels have a function of self-light-emitting, a thin structure, a low power consumption, a high contrast, a high color gamut and a function of flexible display, and the self-light-emitting display panels are widely applied to various electronic devices such as computers, mobile phones.

A self-light-emitting element in the self-light-emitting display panel, for example, may include an organic light emitting diode (OLED), a quantum dot light emitting diode (QLED), a micro light emitting diode (Micro LED), and the like.

However, it is found from research that the conventional display panels (for example, the self-light-emitting display panels), in display, have problems such as a large voltage drop on a power signal line and poor display uniformity of the display panels.

SUMMARY

A display panel and a display device are provided according to the embodiments of the present disclosure to improve the display uniformity of the display panel.

In one embodiment, a display panel is provided according to an embodiment of the present disclosure. One screen display period of the display panel includes N subframes. At least one subframe among the N subframes serves as a target subframe. The display panel includes multiple partitions arranged along a first direction. The partition includes at least one pixel circuit. In the target subframe, a light-emitting control signal received by one pixel circuit in the partition includes M enabling level pulses, where M is an integer greater than 1. The multiple partitions include a first partition and a second partition. In the target subframe, a p-th enabling level pulse of a light-emitting control signal received by a pixel circuit in the first partition and a q-th enabling level pulse of a light-emitting control signal received by a pixel circuit in the second partition overlap at least partially in time. $p \neq q$, $1 \leq p \leq M$, $1 \leq q \leq M$, and p and q are integers.

In another embodiment, a display device is provided according to an embodiment of the present disclosure. The display device includes the display panel described according to the embodiments.

It is found from research that in the conventional technology, sub pixels in a light-emitting state in a display panel are usually concentrated in a same region (referred to as a light-emitting region). In a case that the light-emitting region is far away from a power supply terminal providing a power signal, power signal lines between the sub pixels in the light-emitting region and the power supply terminal are long, and line impedances of power signal lines connected to all sub pixels in the light-emitting region are large, which results in large voltage drops on the power signal lines.

In view of this, a display panel and a display device are provided according to the embodiments of the present disclosure. One screen display period of the display panel includes N subframes. At least one subframe among the N subframe serves as a target subframe. In the target subframe, a light-emitting control signal received by one pixel circuit in a partition includes M enabling level pulses, where M is an integer greater than 1. In the target subframe, a p-th enabling level pulse of a light-emitting control signal received by a pixel circuit in a first partition and a q-th enabling level pulse of a light-emitting control signal received by a pixel circuit in a second partition overlap at least partially in time. $p \neq q$, $1 \leq p \leq M$, $1 \leq q \leq M$, and p and q are integers. In the target subframe, a light-emitting control signal received by one pixel circuit in a partition includes M enabling level pulses, where M is an integer greater than 1, and sub pixels corresponding to the pixel circuit emit light multiple times in the target subframe. In the target subframe, the p-th enabling level pulse in the light-emitting control signal received by the pixel circuit in the first partition and the q-th enabling level pulse in the light-emitting control signal received by the pixel circuit in the second partition overlap at least partially in time, and a p-th light-emitting of the sub pixels corresponding to the pixel circuit in the first partition overlaps with a q-th light-emitting of the sub pixels corresponding to the pixel circuit in the second partition.

BRIEF DESCRIPTION OF THE DRAWINGS

In order to more clearly describe the embodiments of the present disclosure, drawings to be used in the description of the embodiments of the present disclosure are briefly described hereinafter.

DETAILED DESCRIPTION OF EMBODIMENTS

The embodiments of the present disclosure are described in detail below. The embodiments of the present disclosure are described in detail in conjunction with the drawings and the embodiments. It should be understood that the embodiments described herein is only intended to explain the present disclosure rather than limiting the present disclosure. Embodiments of the present disclosure may be implemented without some of the details. The following description of the embodiments is only intended to provide a better understanding for the present disclosure by illustrating the embodiments of the present disclosure.

It should be noted that a relation term such as "first" and "second" herein is only used to distinguish one entity or operation from another entity or operation, and does not necessarily require or imply that there is an actual relation or sequence between these entities or operations. Moreover, terms of "include", "comprise" or any other variants thereof are intended to be non-exclusive. Therefore, a process, method, article or device including a series of elements includes not only the elements but also other elements that are not explicitly listed, or also includes the elements inherent for the process, method, article or device. Unless expressively limited otherwise, the statement "including . . . " does not exclude the case that other similar elements may exist in the process, method, article or device.

It should be understood that the term "and/or" used in the present disclosure is only an association relationship to describe the associated objects, indicating that there may be three kinds of relationships. For example, A and/or B may indicate three cases, such as A exists alone, A and B exist at the same time, and B exists alone. In addition, the character "/" in this specification indicates that the associated objects before and after the character "/" are in an "or" relationship.

In the embodiments of the present disclosure, the term "electrical connection" may refer to a direct electrical connection between two components, or may refer to an electrical connection between two components through one or more other components.

Therefore, the present disclosure is intended to cover modifications and changes of the embodiments, which fall within the scope of the appended claims (the claimed solutions) and their equivalents. It should be noted that the implementations provided in the embodiments of the present disclosure may be combined with each other as long as there is no conflict among them.

In order to facilitate the understanding of the embodiments of the present disclosure, problems existing in the conventional technology are first described in detail in the present disclosure before elaborating the embodiments of the present disclosure.

Figure 1:
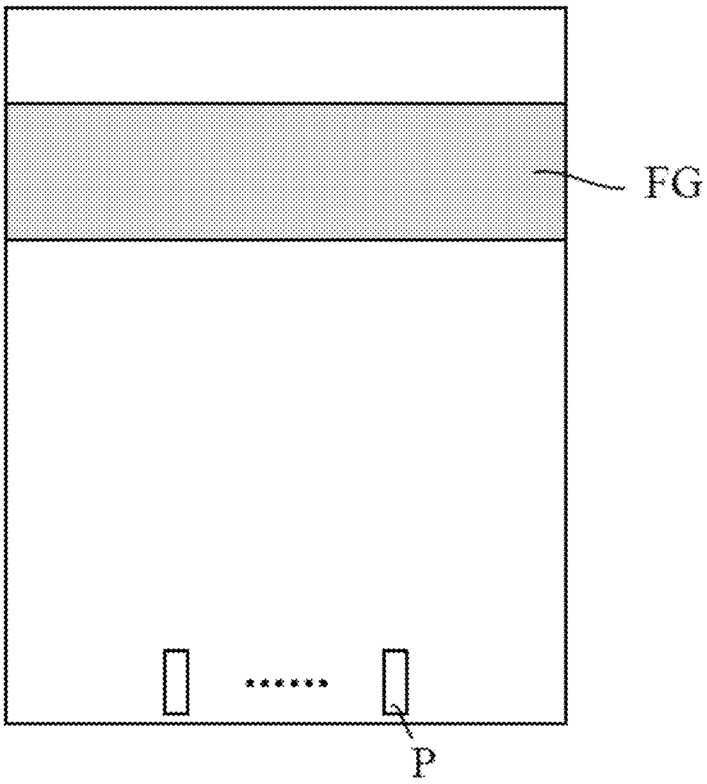
FIG. 1 is a schematic diagram showing a display effect of a display panel in the conventional technology.

FIG. 1 is a schematic diagram showing a display effect of a display panel in the conventional technology. As shown in FIG. 1, in the conventional technology, sub pixels in rows of the display panel are usually lit row by row. For example, when sub pixels in a current row emit light, sub pixels in a next row are lit. Therefore, sub pixels in adjacent multiple rows may emit light at the same time, which is reflected in space and results in that sub pixels in a light-emitting state in the display panel are usually concentrated in a same region (referred to as a light-emitting region), for example, a light-emitting region FG shown in FIG. 1. In a case that the light-emitting region FG is far away from a power supply terminal P providing a power signal, power signal lines (not shown in FIG. 1) between the sub pixels in the light-emitting region FG and the power supply terminal P are long, and line impedances of power signal lines connected to all sub pixels in the light-emitting region are large, which results in large voltage drops on the power signal lines and poor display uniformity of the display panel.

Figure 2:
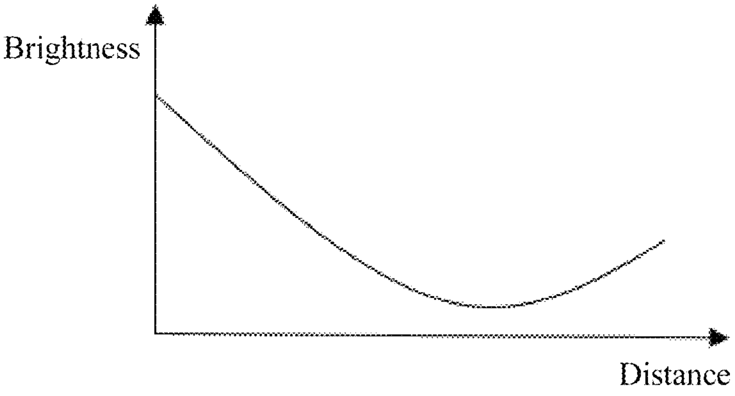
FIG. 2 is a schematic diagram showing a relationship between brightness and distance of a display panel in the conventional technology.

FIG. 2 is a schematic diagram showing a relationship between brightness and distance of a display panel in the conventional technology. An abscissa in FIG. 2 denotes a distance between the light-emitting region and the power supply terminal, and an ordinate denotes brightness of the light-emitting region. As shown in FIG. 2, in a case that the light-emitting region is far from the power supply terminal, the brightness of the light-emitting region is low due to large voltage drops on the power signal lines. In one embodiment, as the distance between the light-emitting region and the power supply terminal changes, the brightness of the light-emitting region changes. In a case that sub pixels in a light-emitting state are concentrate in a same light-emitting region, the brightness of the light-emitting region changes significantly as the distance between the light-emitting region and the power supply terminal changes, resulting in poor display uniformity of the display panel.

In view of the above research findings, a display panel and a display device are provided according to the embodiments of the present disclosure to solve the problem of poor display uniformity of the display panel in the conventional technology.

The embodiments of the present disclosure is as follows. In the target subframe, a light-emitting control signal received by one pixel circuit in a partition includes M enabling level pulses, where M is an integer greater than 1, and sub pixels corresponding to the pixel circuit emit light multiple times in the target subframe. In the target subframe, a p-th enabling level pulse in a light-emitting control signal received by a pixel circuit in a first partition and a q-th enabling level pulse in a light-emitting control signal received by a pixel circuit in a second partition overlap at least partially in time, and a p-th light-emitting of the sub pixels corresponding to the pixel circuit in the first partition overlaps with a q-th light-emitting of the sub pixels corresponding to the pixel circuit in the second partition. and an original light-emitting region is divided into at least two discontinuous partitions, such as the first partition and the second partition. In this way, the distance between at least part of the light-emitting region and the power supply terminal is reduced, and line impedances of power signal lines connected to sub pixels in at least part of the light-emitting region are reduced, to reduce the voltage drops on the power signal lines and improving the display uniformity of the display panel.

A display panel according to an embodiment of the present disclosure is first described below.

Figure 3:
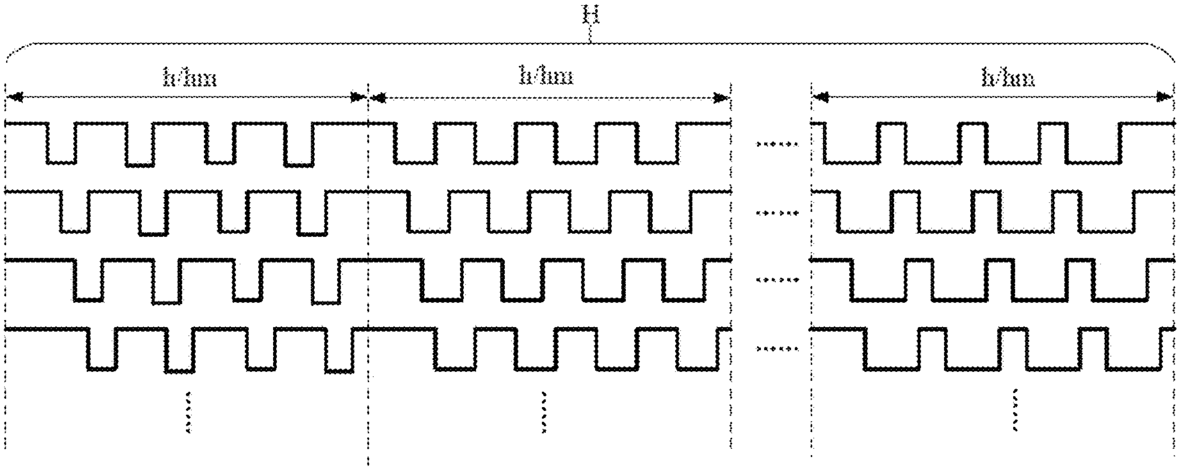
FIG. 3 is a schematic timing diagram of a screen display period of a display panel according to an embodiment of the present disclosure.

FIG. 3 is a schematic timing diagram of one screen display period of a display panel according to an embodiment of the present disclosure. As shown in FIG. 3, one screen display period H of the display panel includes N subframes h. A value of N may be flexibly determined according to actual situations, and is not limited in the embodiments of the present disclosure. For example, N may be an integer greater than 1. One screen display period H may be understood as a period of displaying one frame of screen, that is, one frame. One frame may be divided into N subframes h. At least one subframe h among the N subframes h serves as a target subframe hm.

Figure 4:
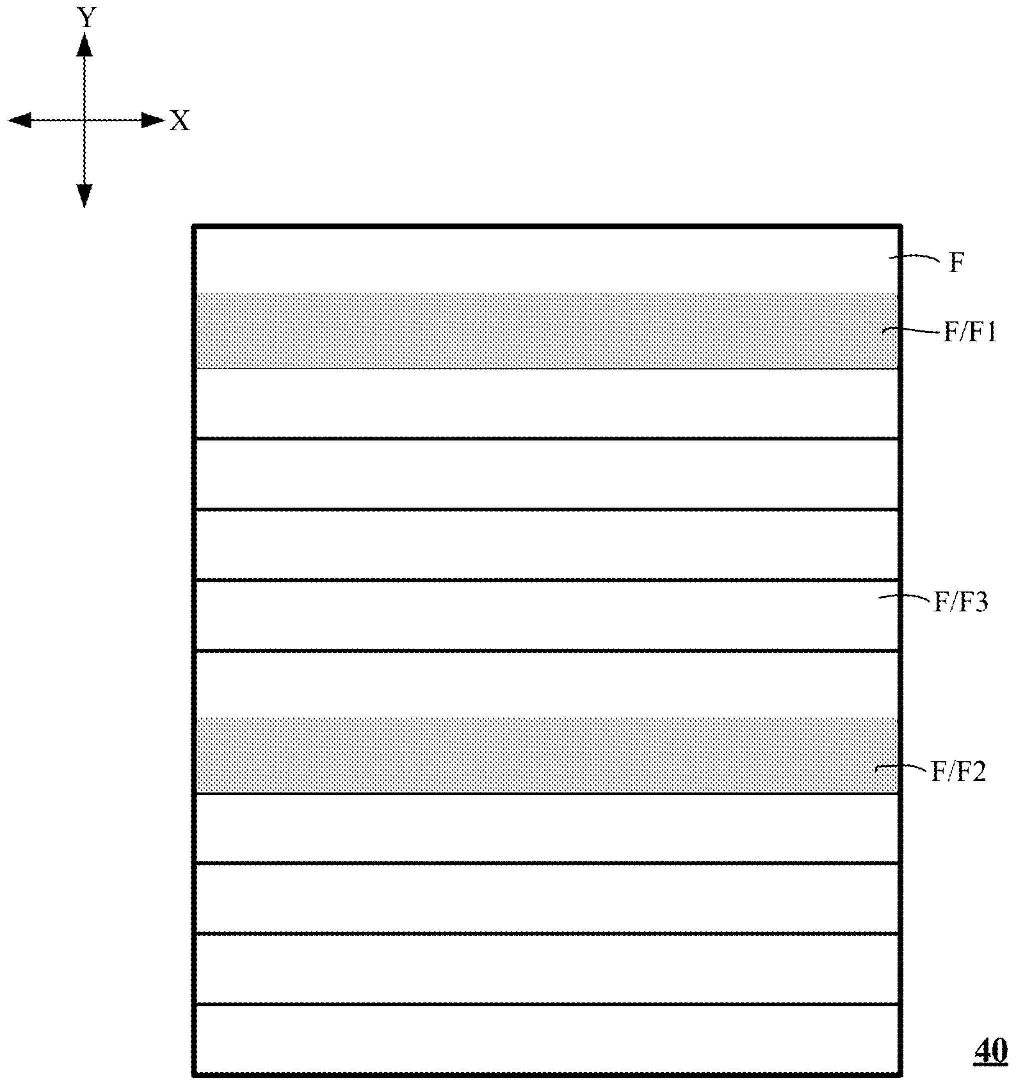
FIG. 4 is a schematic structural diagram of a display panel according to an embodiment of the present disclosure.

FIG. 4 is a schematic structural diagram of a display panel according to an embodiment of the present disclosure. As shown in FIG. 4, the display panel 40 includes multiple partitions F arranged in a first direction Y. For example, the first direction Y includes, but is not limited to, a column direction of the display panel 40. Each partition F includes at least one pixel circuit (not shown in FIG. 4).

Figure 5:
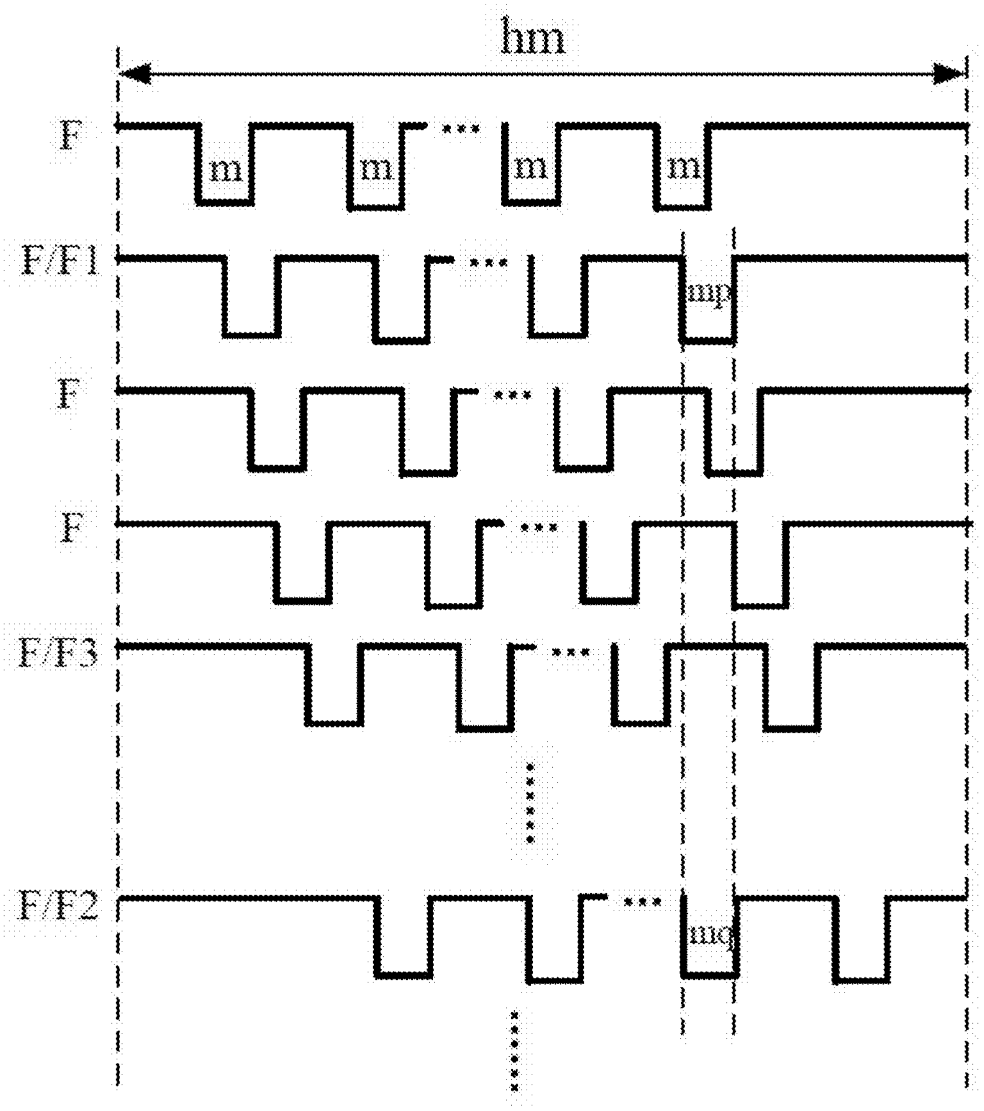
FIG. 5 is a schematic waveform diagram of a light-emitting control signal in a target subframe.

FIG. 5 is a schematic waveform diagram of a light-emitting control signal in the target subframe according to an embodiment of the present disclosure. As shown in FIG. 3 to FIG. 5, in the target subframe hm, a light-emitting control signal received by one pixel circuit in a partition F may include M enabling level pulses m, where M is an integer greater than 1. A value of M may be flexibly determined according to actual situations, and is not limited in the embodiments of the present disclosure. FIG. 3 is shown by taking M=4 as an example. However, M may also be equal to other values, and the value of M is not limited in the embodiments of the present disclosure. The light-emitting control signal is used for controlling a light-emitting control transistor in a pixel circuit to be switched on/off. For example, in a case that the light-emitting control signal is an enabling level pulse, the light-emitting control signal controls the light-emitting control transistor in the pixel circuit to be switched on, and the pixel circuit provides a driving current to a light-emitting element to drive the light-emitting element to emit light.

FIG. 3 and FIG. 5 illustrate that the light-emitting control transistor is a P-type transistor and the enabling level pulse m is a low-level pulse. However, in a case that the light-emitting control transistor is an N-type transistor, the enabling level pulse m may also be a high-level pulse, which is not limited in the embodiments of the present disclosure.

As shown in FIG. 3 to FIG. 5, the multiple partitions F may include a first partition F1 and a second partition F2. The first partition F1 and the second partition F2 may be different partitions F. In some examples, the first partition F1 and the second partition F2 may be separate partitions F. That is, the first partition F1 and the second partition F2 may be separated by at least one partition F. In the target subframe hm, a p-th enabling level pulse (the enabling level pulse mp shown in FIG. 5) in a light-emitting control signal received by a pixel circuit in the first partition F1 and a q-th enabling level pulse (the enabling level pulse mq shown in FIG. 5) in a light-emitting control signal received by a pixel circuit in the second partition F2 overlap at least partially in time. p≠q, 1≤p≤M, 1≤q≤M, and p and q are integers.

Since the p-th enabling level pulse in the light-emitting control signal received by the pixel circuit in the first partition F1 and the q-th enabling level pulse in the light-emitting control signal received by the pixel circuit in the second partition F2 overlap at least partially in time, a p-th light emitting of sub pixels corresponding to the pixel circuit in the first partition F1 overlaps with a q-th light emitting of sub pixels corresponding to the pixel circuit in the second partition F2. In addition, p≠q, and the first partition F1 and the second partition F2 are separated by at least one partition F. That is, the first partition F1 and the second partition F2 are separate partitions F. In this way, the light-emitting region can be divided into at least two separate partitions, for example, the first partition F1 and the second partition F2.

One screen display period of the display panel according to the embodiments of the present disclosure includes N subframes. At least one subframe among the N subframe serves as a target subframe. In the target subframe, a light-emitting control signal received by one pixel circuit in a partition includes M enabling level pulses, where M is an integer greater than 1. In the target subframe, a p-th enabling level pulse of a light-emitting control signal received by a pixel circuit in a first partition and a q-th enabling level pulse of a light-emitting control signal received by a pixel circuit in a second partition overlap at least partially in time. p≠q, 1≤p≤M, 1≤q≤M, and p and q are integers. In the target subframe, a light-emitting control signal received by one pixel circuit in a partition includes M enabling level pulses, where M is an integer greater than 1, and sub pixels corresponding to the pixel circuit emit light multiple times in the target subframe. In the target subframe, the p-th enabling level pulse in the light-emitting control signal received by the pixel circuit in the first partition and the q-th enabling level pulse in the light-emitting control signal received by the pixel circuit in the second partition overlap at least partially in time, and a p-th light-emitting of the sub pixels corresponding to the pixel circuit in the first partition overlaps with a q-th light-emitting of the sub pixels corresponding to the pixel circuit in the second partition. p≠q, and an original light-emitting region is divided into at least two discontinuous partitions, such as the first partition and the second partition. In this way, the distance between at least part of the light-emitting region and the power supply terminal is reduced, and line impedances of power signal lines connected to sub pixels in at least part of the light-emitting region are reduced, to reduce the voltage drops on the power signal lines and improving the display uniformity of the display panel.

As shown in FIG. 4, according to some embodiments of the present disclosure, the multiple partitions F may include a third partition F3. The first partition F1 and the second partition F2 are separated by the third partition F3. The third partition F3 may be any partition F arranged between the first partition F1 and the second partition F2. The number of the third partition F3 is not limited in the embodiments of the present disclosure. The third partition F3 may include one partition F, or two or more partitions F.

As shown in FIG. 4 and FIG. 5, in the target subframe hm, all of M enabling level pulses in a light-emitting control signal received by a pixel circuit in the third partition F3 do not overlap with the p-th enabling level pulse (the enabling level pulse mp shown in FIG. 5) in the light-emitting control signal received by the pixel circuit in the first partition F1 in time.

That is, in the target subframe hm, when the sub pixels corresponding to the pixel circuit in the first partition F1 emits light for the p-th time, sub pixels in the third partition F3 do not emit light. Thus, the light-emitting region is divided into two separate partitions, for example, the first partition F1 and the second partition F2. In this way, the distance between at least part of the light-emitting region and the power supply terminal is reduced, and line impedances of power signal lines connected to sub pixels in at least part of the light-emitting region are reduced, to reduce the voltage drops on the power signal lines and improving the display uniformity of the display panel.

In some embodiments, in the target subframe hm, the M enabling level pulses in the light-emitting control signal received by the pixel circuit in the third partition F3 may not overlap with the q-th enabling level pulse (the enabling level pulse mq shown in FIG. 5) in the light-emitting control signal received by the pixel circuit in the second partition F2 in time. That is, in the target subframe hm, when the sub pixels corresponding to the pixel circuit in the second partition F2 emits light for a q-th time, sub pixels in the third partition F3 do not emit light.

Figure 6:
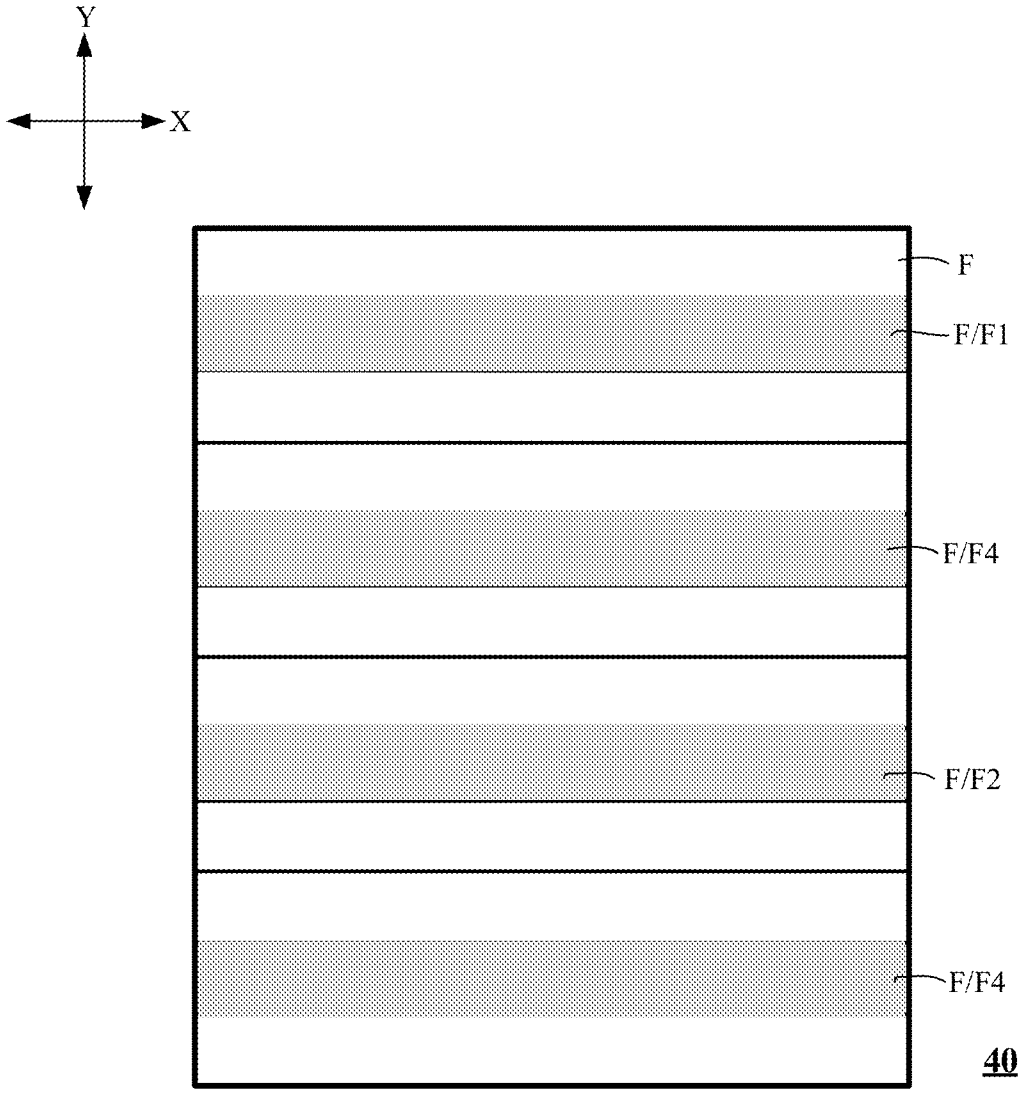
FIG. 6 is a schematic structural diagram of a display panel according to another embodiment of the present disclosure.

FIG. 6 is a schematic structural diagram of a display panel according to another embodiment of the present disclosure. As shown in FIG. 6, according to some embodiments of the present disclosure, the multiple partitions F may include at least one fourth partition F4. The number of the fourth partition F4 is not limited in the embodiments of the present disclosure. The display panel 40 may include one fourth partition F4 or multiple fourth partitions F4. Along the first direction Y, the fourth partition F4 may be arranged between the first partition F1 and the second partition F2. In one embodiment, along the first direction Y, the fourth partition F4 may be arranged on a side, of the second partition F2, away from the first partition F1. In one embodiment, along the first direction Y, the fourth partition F4 may be arranged on a side, of the first partition F1, away from the second partition F2.

For example, as shown in FIG. 6, in a case that the display panel 40 includes multiple fourth partitions F4, some of the multiple fourth partitions F4 may be arranged between the first partition F1 and the second partition F2, and other of the multiple fourth partitions F4 may be arranged on a side, of the second partition F2, away from the first partition F1 and/or a side, of the first partition F1, away from the second partition F2. For another example, in a case that the display panel includes multiple fourth partitions F4, all of the multiple fourth partitions F4 may be arranged on a side, of the second partition F2, away from the first partition F1. For another example, in a case that the display panel includes multiple fourth partitions F4, all of the multiple fourth partitions F4 may be arranged on a side, of the first partition F1, away from the second partition F2, which is not limited in the embodiments of the present disclosure.

Figure 7:
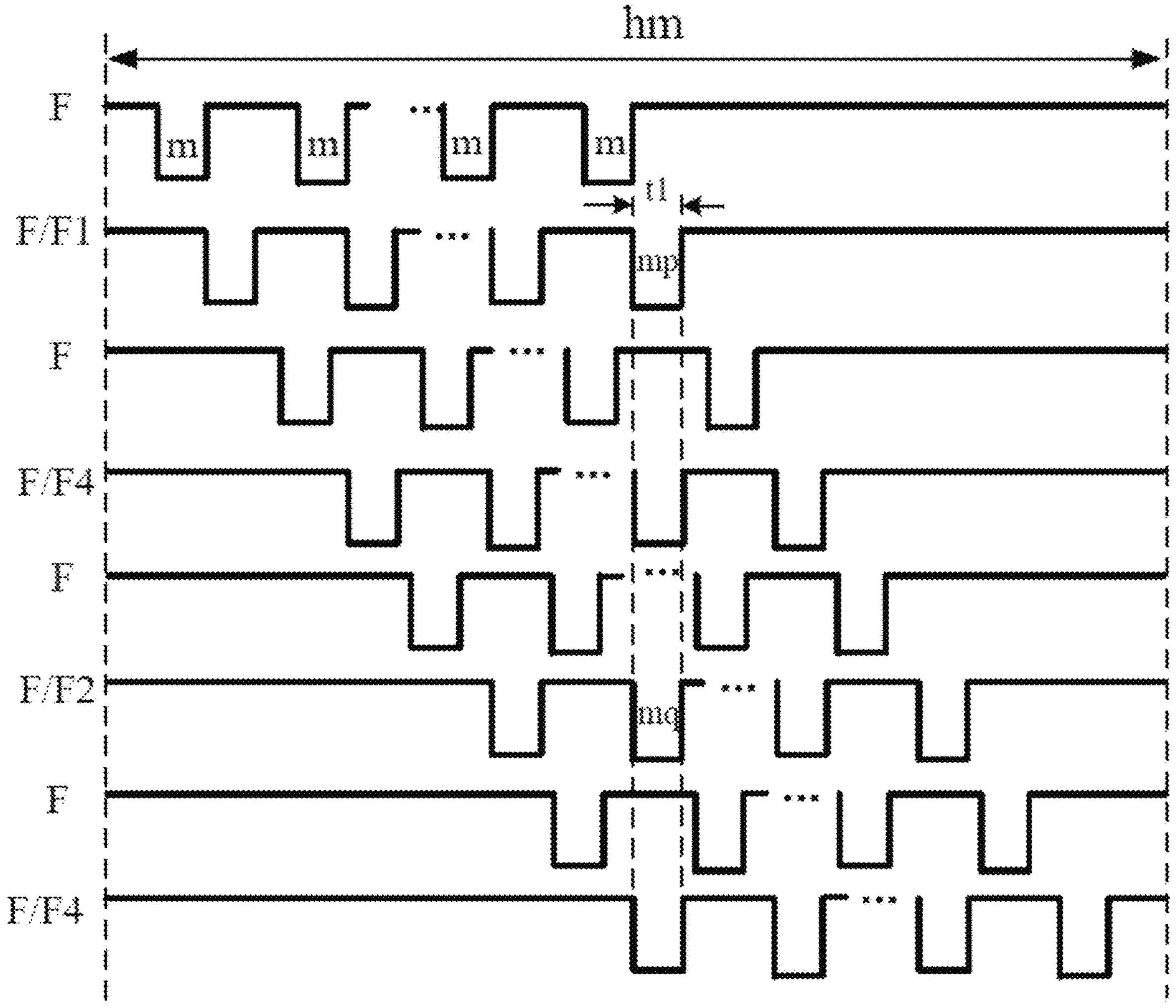
FIG. 7 is another schematic waveform diagram of a light-emitting control signal in a target subframe.

FIG. 7 is another schematic waveform diagram of a light-emitting control signal in the target subframe. As shown in FIG. 6 and FIG. 7, a time period, during which the p-th enabling level pulse mp (hereinafter referred to as the p-th enabling level pulse mp) in the light-emitting control signal received by the pixel circuit in the first partition F1 overlaps with the q-th enabling level pulse mq (hereinafter referred to as the q-th enabling level pulse mq) in the light-emitting control signal received by the pixel circuit in the second partition F2, is a target time period t1.

In the target time period t1, an enabling level pulse m in the light-emitting control signal received by the pixel circuit in the fourth partition F4 and the p-th enabling level pulse mp overlap at least partially in time. That is, in the target subframe hm, when the sub pixels corresponding to the pixel circuit in the first partition F1 emit light for the p-th time, both the sub pixels in the second partition F2 and the sub pixels in the fourth partition F4 emit light. In this way, the light-emitting region is divided into more separate partitions, for example, the first partition F1, the second partition F2 and at least one fourth partition F4. In this way, light-emitting region is distributed more uniformly, which further improves the display uniformity of the display panel. In addition, the distance between at least part of the light-emitting region and the power supply terminal is reduced, and line impedances of power signal lines connected to sub pixels in at least part of the light-emitting region are reduced, to reduce the voltage drops on the power signal lines.

According to some embodiments of the present disclosure, in a case that the display panel includes multiple light-emitting partitions F, i.e. the first partition F1, the second partition F2 and the fourth partition F4, spacing between two adjacent light-emitting partitions F is constant. In this way, since the spacing between two adjacent light-emitting partitions F is constant, light-emitting region is distributed more uniformly, which further improves the display uniformity of the display panel.

Figure 8:
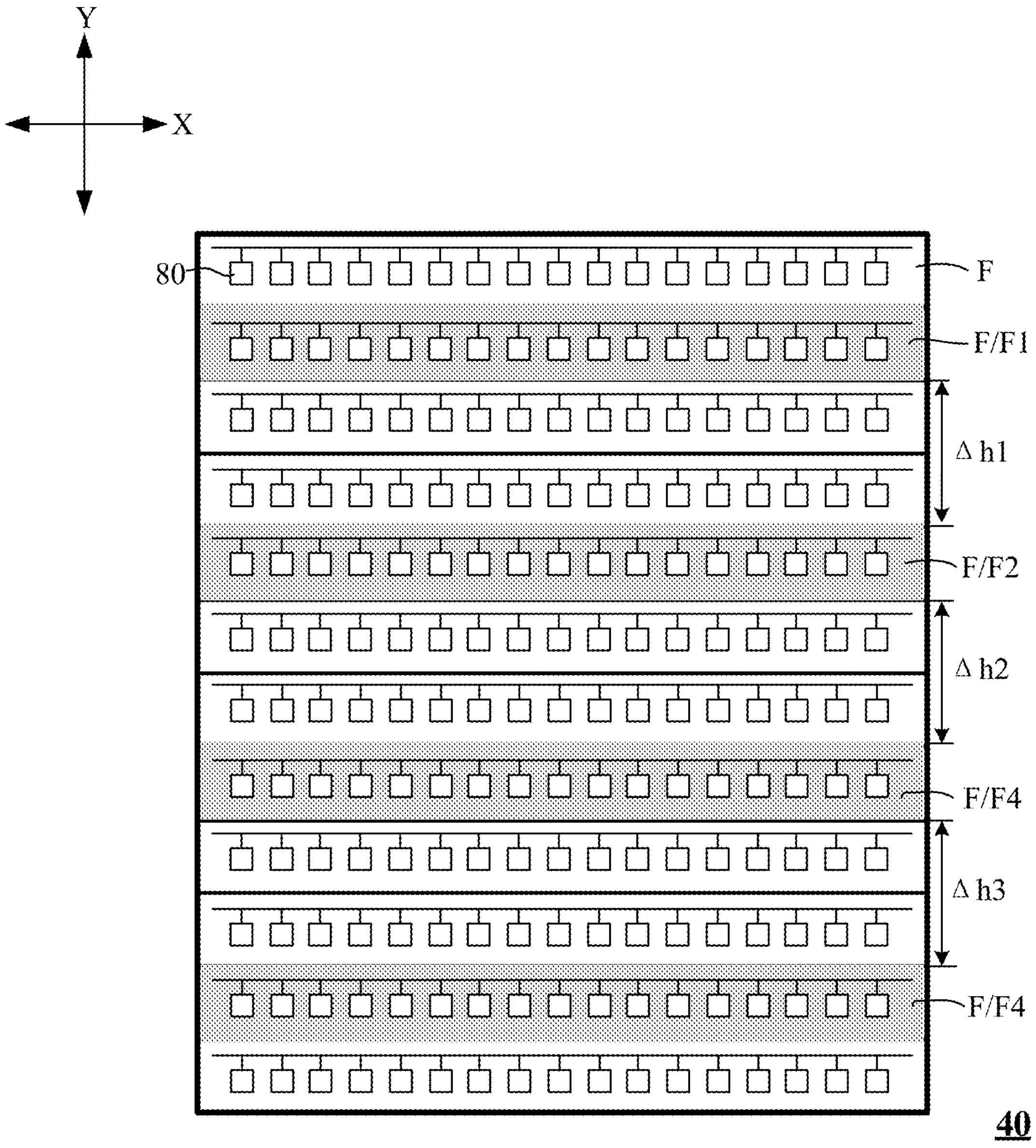
FIG. 8 is a schematic structural diagram of a display panel according to another embodiment of the present disclosure.

FIG. 8 is a schematic structural diagram of a display panel according to another embodiment of the present disclosure. As shown in FIG. 8, for example, according to some embodiments of the present disclosure, along the first direction Y, the fourth partition F4 is arranged on a side, of the second partition F2, away from the first partition F1. A minimum spacing Δh1 between the first partition F1 and the second partition F2 is the same as a minimum spacing Δh2 between the second partition F2 and the fourth partition F4.

As shown in FIG. 8, in a case that the display panel includes multiple fourth partitions F4, the minimum spacing Δh2 between the second partition F2 and the fourth partition F4 may be a spacing between the second partition F2 and a fourth partition F4 closest to the second partition F2. In addition, a minimum spacing Δh3 between two adjacent fourth partitions F4 may be the same as a minimum spacing Δh1 between the first partition F1 and the second partition F2.

In this way, the minimum spacing Δh1 between the first partition F1 and the second partition F2 is the same as the minimum spacing Δh2 between the second partition F2 and the fourth partition F4, and light-emitting region is distributed more uniformly, which further improves the display uniformity of the display panel.

Referring to FIG. 8, according to some embodiments of the present disclosure, each partition F may include at least one row of pixel circuits 80. Each row of pixel circuits 80 may include multiple pixel circuits 80 arranged along a second direction X. The second direction X intersects the first direction Y. It should be noted that FIG. 8 shows that each partition F includes one row of pixel circuits 80 as an example. However, each partition F may also include multi rows of pixel circuits 80, which is not limited in the embodiments of the present disclosure.

The number of rows of pixel circuits 80 arranged between the first partition F1 and the second partition F2 may be the same as the number of rows of the pixel circuits 80 arranged between the second partition F2 and the fourth partition F4. For example, along the first direction Y, K rows of pixel circuits 80 are arranged between the first partition F1 and the second partition F2, and K rows of pixel circuits 80 are arranged between the second partition F2 and the fourth partition F4, where K is a positive integer.

As shown in FIG. 8, in a case that the display panel includes multiple fourth partitions F4, the number of rows of the pixel circuits 80 arranged between the second partition F2 and the fourth partition F4 may be the number of rows of the pixel circuits 80 arranged between the second partition F2 and the fourth partition F4 closest to the second partition F2. That is, number of rows of the pixel circuits 80 arranged between the second partition F2 and the fourth partition F4 closest to the second partition F2 is equal to the number of rows of the pixel circuits 80 arranged between the first partition F1 and the second partition F2. In addition, the number of rows of pixel circuits 80 arranged between two adjacent fourth partitions F4 may be the same as the number of rows of the pixel circuits 80 arranged between the first partition F1 and the second partition F2.

In this way, the number of rows of the pixel circuits 80 arranged between the first partition F1 and the second partition F2 is the same as the number of rows of the pixel circuits 80 arranged between the second partition F2 and the fourth partition F4, and light-emitting region is distributed more uniformly, which further improves the display uniformity of the display panel.

According to some embodiments of the present disclosure, the number of rows of pixel circuit 80 arranged in the first partition F1 may be the same as the number of rows of pixel circuits 80 arranged in the second partition F2. In a case that the display panel includes the fourth partition F4, the number of rows of pixel circuits 80 arranged in the fourth partition F4 may be the same as the number of rows of the pixel circuits 80 arranged in the first partition F1.

In this way, the various light-emitting partitions F have a same width or similar widths along the first direction Y, and the light-emitting region is distributed more uniformly, which further improves the display uniformity of the display panel.

Referring to FIG. 8, according to some embodiments of the present disclosure, the multiple partitions F may include multiple fourth partitions F4. Two adjacent fourth partitions F4 may be separated by at least one partition F.

Figure 9:
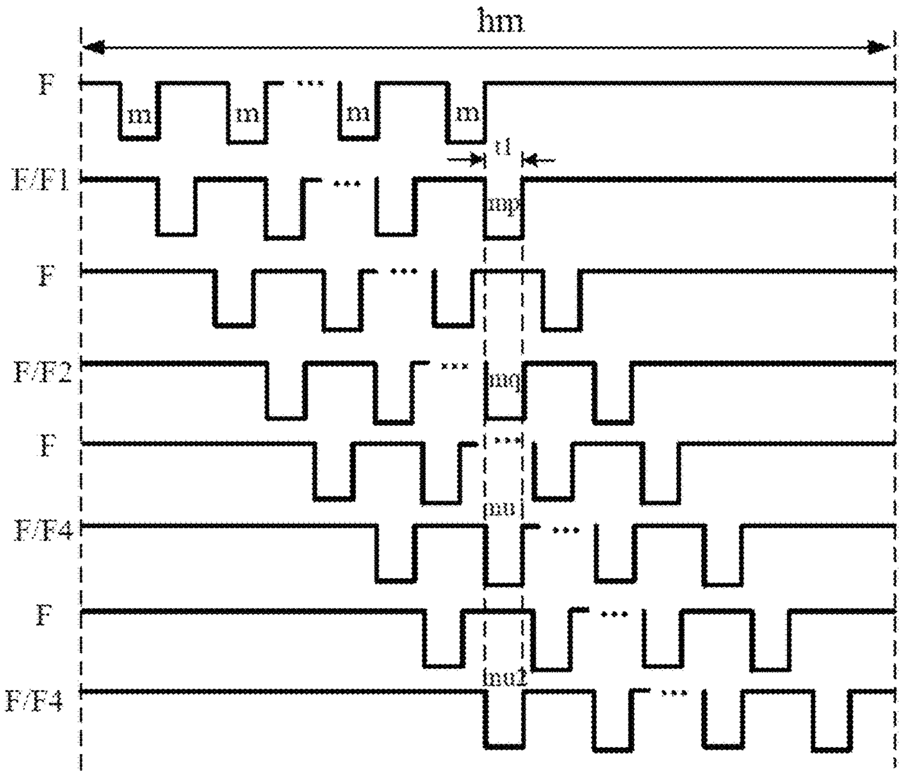
FIG. 9 is another schematic waveform diagram of a light-emitting control signal in a target subframe.

FIG. 9 is another schematic waveform diagram of a light-emitting control signal in the target subframe. As shown in FIG. 8 and FIG. 9, during the target time period t1, enabling level pulses m, in different fourth partitions F4, that overlap at least partially with the p-th enabling level pulse mp in time have different sequence numbers.

Taking a case that the display panel includes two fourth partitions F4 as an example, during the target time period t1, a u1-th enabling level pulse mu1 in a light-emitting control signal received by a pixel circuit in one of the two fourth partitions F4 overlap at least partially with the p-th enabling level pulse mp in the first partition F1, and a u2-th enabling level pulse mu2 in a light-emitting control signal received by a pixel circuit in the other of the two fourth partitions F4 overlap at least partially with the p-th enabling level pulse mp in the first partition F1. $u1 \neq u2 \neq p \neq q$, $1 \leq u1 \leq M$, $1 \leq u2 \leq M$, and u1 and u2 are integers.

The p-th enabling level pulse mp for the first partition F1, the q-th enabling level pulse mq for the second partition F2, the enabling level pulse mu1 for one of the two fourth partitions F4 and the enabling level pulse mu2 for the other of the two fourth partitions F4 overlap at least partially in time, and the p-th light emitting of the sub pixels corresponding to the pixel circuit in the first partition F1, the q-th light emitting of the sub pixels corresponding to the pixel circuit in the second partition F2, a u1-th light emitting of sub pixels corresponding to the pixel circuit in one of the two fourth partitions F4, and a u2-th light emitting of sub pixels corresponding to the pixel circuit in the other of the two fourth partitions F4 overlap. In addition, $u1 \neq u2 \neq p \neq q$, and two adjacent fourth partitions F4 are separated by at least one partition F, the first partition F1 and the second partition F2 are separated by at least one partition F, and the second partition F2 and the fourth partition F4 are separated by at least one partition F. In this way, the light-emitting region can be divided into multiple separated partitions, for example, the first partition F1, the second partition F2 and the fourth partition F4. Therefore, the light-emitting region is divided into more separated regions, the light-emitting region is distributed more uniformly, which further improves the display uniformity of the display panel. In one embodiment, the distance between at least part of the light-emitting region and the power supply terminal is reduced, and line impedances of power signal lines connected to sub pixels in at least part of the light-emitting region are reduced, to reduce the voltage drops on the power signal lines.

It is found that a duty ratio of a light-emitting control signal may be small in some subframes. In the embodiments of the present disclosure, a duty ratio of a light-emitting control signal may be understood as a ratio of an enabling level in the light-emitting control signal. A larger duty ratio of a light-emitting control signal indicates a longer light-emitting time period of each row of sub pixels, and accordingly light-emitting time periods of more multiple adjacent rows of sub pixels overlap. In space, a larger duty ratio indicates that there are more rows of sub pixels in a light-emitting state and that an area (or coverage) of the light-emitting region is larger. A smaller duty ratio of the light-emitting control signal indicates a smaller area of the light-emitting region, that is, a smaller number of sub pixels in the light-emitting region.

In a case of a small number of sub pixels in the light-emitting region, the number of sub pixels driven by power signal lines is small, and the voltage drops on the power signal lines are small.

In view of this, in the present disclosure, a solution of single light-emitting is adopted in a case that the duty ratio of the light-emitting control signal is small, to further reduce the control difficulty with ensuring small voltage drops on power signal lines.

Figure 10:
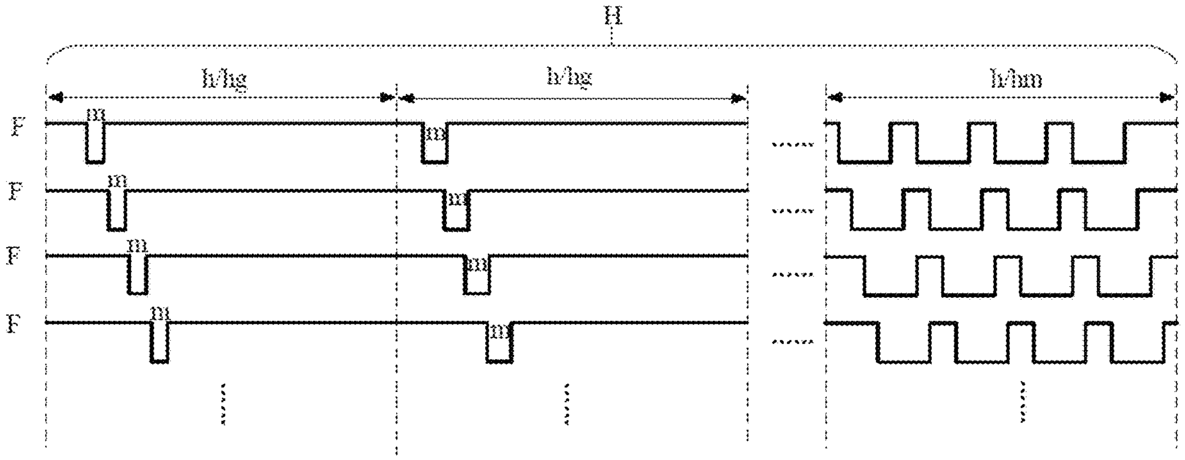
FIG. 10 is a schematic timing diagram of a screen display period of a display panel according to another embodiment of the present disclosure.

FIG. 10 is a schematic timing diagram of one screen display period of a display panel according to another embodiment of the present disclosure. As shown in FIG. 10, at least one subframe h among the N subframes h serves as a fixed target subframe hg.

In the fixed target subframe hg, a duty ratio of a light-emitting control signal received by a pixel circuit in a partition F is less than a first preset threshold. That is, in the fixed target subframe hg, the duty ratio of the light-emitting control signal is small. The first preset threshold may be flexibly determined according to actual situations, and is not limited in the embodiments of the present disclosure.

In the fixed target subframe hg, the light-emitting control signal received by the pixel circuit in the partition F may include one enabling level pulse m. That is, in a fixed target subframe hg, sub pixels corresponding to a pixel circuit in each partition F may emit light only once to achieve single light-emitting.

As shown in FIG. 10, in the fixed target subframe hg, multiple partitions F successively receive an enabling level pulse m. That is, along the first direction (Y direction as shown in FIG. 8), the multiple partitions F can be successively lit one partition by one partition. Light-emitting time periods of adjacent partitions F may overlap or may not overlap, which is not limited in the embodiments of the present disclosure.

Figure 11:
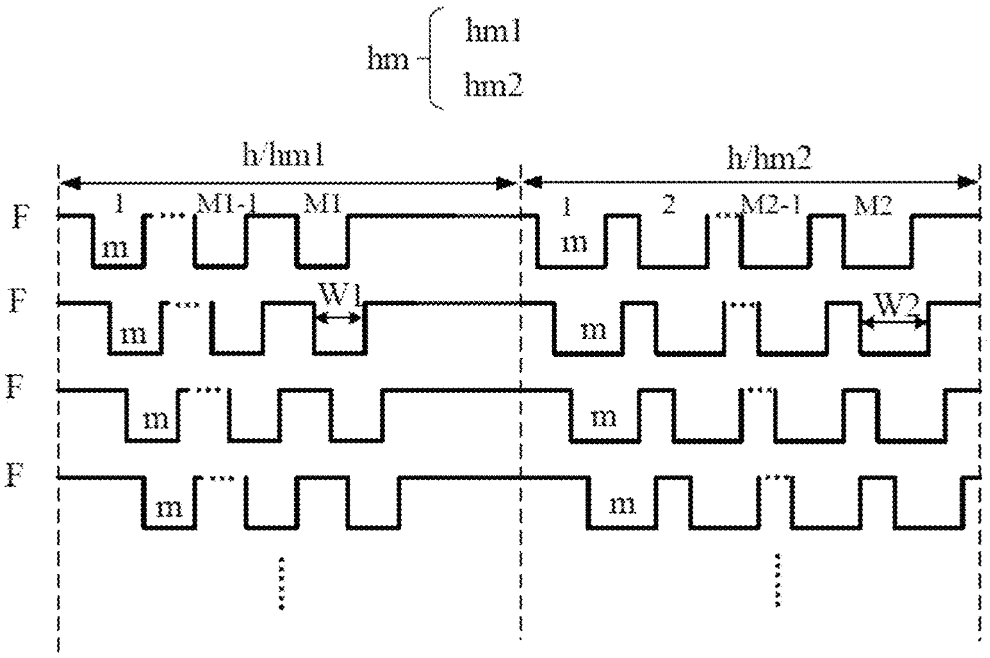
FIG. 11 is another schematic waveform diagram of a light-emitting control signal in a target subframe.

FIG. 11 is another schematic waveform diagram of a light-emitting control signal in the target subframe. As shown in FIG. 11, according to some embodiments of the present disclosure, the target subframe hm may include a first target subframe hm1 and a second target subframe hm2. The first target subframe hm1 and the second target subframe hm2 are different subframes h.

In the first target subframe hm1, a duty ratio of a light-emitting control signal received by one pixel circuit in the partition F is equal to a first duty ratio, and the light-emitting control signal received by the pixel circuit in the partition F includes M1 enabling level pulses m.

In the second target subframe hm2, a duty ratio of the light-emitting control signal received by one pixel circuit in the partition F is equal to a second duty ratio, and the light-emitting control signal received by the pixel circuit in the partition F includes M2 enabling level pulses m.

The first duty ratio is different from the second duty ratio. For example, a light-emitting time period of a row of sub pixels in the partition F in the first target subframe hm1 is different from a light-emitting time period of a row of sub pixels in the partition F in the second target subframe hm2. Accordingly, M1 and M1 and M2 are integers greater than 1. Values of M1 and M2 may be flexibly determined according to actual situations, which is not limited in the embodiments of the present disclosure.

Thus, in a case that light-emitting control signals respectively corresponding to different target subframes are different in duty ratio, requirements of duty ratio for different target subframes can be met by flexibly adjusting the number of enabling level pulses in the light-emitting control signal, and duty ratios of the light-emitting control signals in the target subframes reach desired target duty ratios.

It should be noted that in other embodiments of the present disclosure, in addition to the first target subframe hm1 and the second target subframe hm2, the target subframe hm may further include, for example, a third target subframe to an N1-th target subframe, where N1 is an integer greater than or equal to 3. Light-emitting control signals respectively corresponding to the third target subframe to the N1-th target subframe may be different in duty ratio, and the duty ratios of the light-emitting control signals respectively corresponding to the third target subframe to the N1-th target subframe are not equal to the first duty ratio and the second duty ratio. Accordingly, the light-emitting control signals respectively corresponding to the third target subframe to the N1-th target subframe may be different in the numbers of enabling level pulses, and the numbers of the enabling level pulses of the light-emitting control signals respectively corresponding to the third target subframe to the N1-th target subframe are not equal to M1 and M2.

Referring to FIG. 11, according to some embodiments of the present disclosure, a pulse width W2 of the enabling level pulse m in the second target subframe hm2 may be different from a pulse width W1 of the enabling level pulse m in the first target subframe hm1.

For example, in a case that the light-emitting control signal has a large duty ratio, the enabling level pulse m in the light-emitting control signal may have a large pulse width.

In this way, in a case that the light-emitting control signals respectively corresponding to different target subframes are different in duty ratio, pulse widths of enabling level pulses in the light-emitting control signals for different target subframes may be flexibly adjusted, for example, difference between the light-emitting control signals respectively corresponding to different target subframes in the number of enabling level pulses may be reduced, and the different target subframes are similar in the number of partitions into which the light-emitting region is divided, which reduces the difficulty in controlling light emitting.

According to other embodiments of the present disclosure, the pulse width W2 of the enabling level pulse m in the second target subframe hm2 may be the same as the pulse width W1 of the enabling level pulse m in the first target subframe hm1.

In this way, since the pulse width W2 of the enabling level pulse m in the second target subframe hm2 is the same as the pulse width W1 of the enabling level pulse m in the first target subframe hm1, a width, along the first direction, of the light-emitting partitions (for example, the first partition and the second partition) in the second target subframe hm2 is the same as a width, along the first direction, of the light-emitting partitions (for example, the first partition and the second partition) in the first target subframe hm1, which reduces a jump change of the width of the light-emitting partitions in different target subframes, to improve the display stability of the display panel.

Referring to FIG. 11, in some specific embodiments, the first duty ratio may be less than the second duty ratio. That is, a light-emitting time period of a row of sub pixels in a partition F in the first target subframe hm1 may be less than a light-emitting time period of the row of the sub pixels in the partition F in the second target subframe hm2. Accordingly, M1 may be less than M2. That is, the number of enabling level pulses in the light-emitting control signal corresponding to the first target subframe hm1 may be less than the number of enabling level pulses in the light-emitting control signal corresponding to the second target subframe hm2.

In this way, on the one hand, since the first duty ratio is less than the second duty ratio, and M1 is made less than M2, to meet requirements of duty ratio for different target subframes. For example, the duty ratio of the light-emitting control signal for the first target subframe reaches the desired first duty ratio, and the duty ratio of the light-emitting control signal for the second target subframe reaches the desired second duty ratio. On the other hand, with the increase of the duty ratio of the light-emitting control signal, the number of light-emitting times of sub pixels in various partitions in the target subframe can be increased by increasing the number of enabling level pulses of the light-emitting control signal corresponding to the target subframe, which is conducive to dividing the light-emitting region into more partitions and distributing the light-emitting region more uniformly, to improve the display uniformity of the display panel.

Referring to FIG. 11, in some embodiments, in a case that the first duty ratio is less than the second duty ratio, the pulse width W2 of the enabling level pulse m in the second target subframe hm2 may be greater than or equal to the pulse width W1 of the enabling level pulse m in the first target subframe hm1. FIG. 11 shows that the pulse width W2 of the enabling level pulse m in the second target subframe hm2 is greater than the pulse width W1 of the enabling level pulse m in the first target subframe hm1. However, in other embodiments, the pulse width W2 of the enabling level pulse m in the second target subframe hm2 may also be equal to the pulse width W1 of the enabling level pulse m in the first target subframe hm1.

That is, in a case that the light-emitting control signal has a large duty ratio, a large pulse width may be set for the enabling level pulse m in the light-emitting control signal.

In this way, in a case that the light-emitting control signals respectively corresponding to different target subframes are different in duty ratio, pulse widths of enabling level pulses in the light-emitting control signals for different target subframes may be flexibly adjusted, for example, difference between the light-emitting control signals respectively corresponding to different target subframes in the number of enabling level pulses may be reduced, and the different target subframes are similar in the number of partitions into which the light-emitting region is divided, which reduces the difficulty in controlling light emitting.

Figure 12:
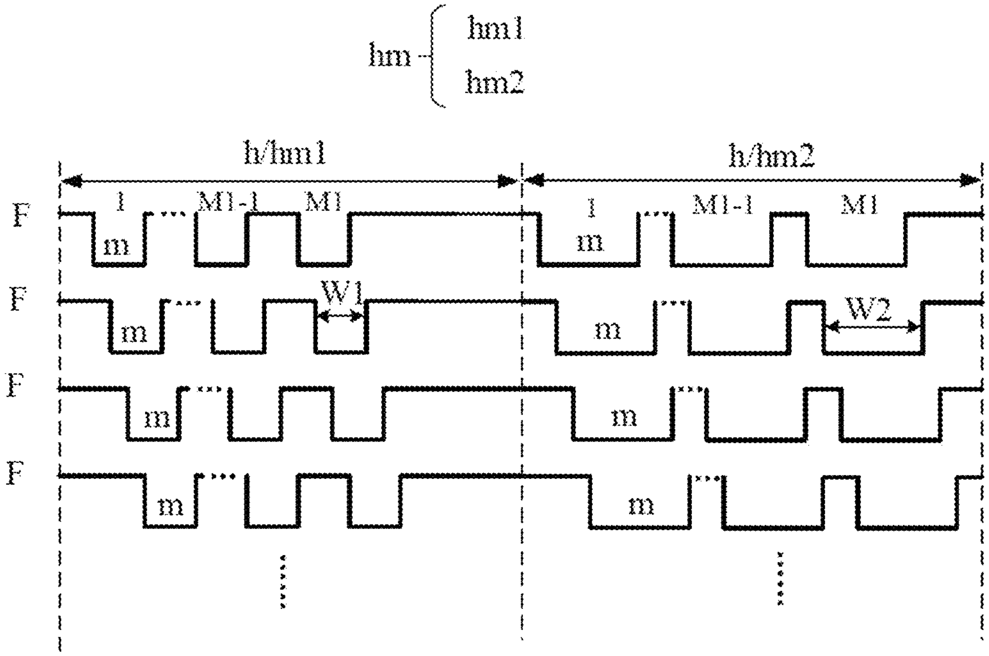
FIG. 12 is another schematic waveform diagram of a light-emitting control signal in a target subframe.

FIG. 12 is another schematic waveform diagram of a light-emitting control signal in the target subframe. As shown in FIG. 12, according to some embodiments of the present disclosure, the target subframe hm may include a first target subframe hm1 and a second target subframe hm2. The first target subframe hm1 and the second target subframe hm2 are different subframes h. The embodiment shown in FIG. 12 is different from the embodiment shown in FIG. 11 in that the number of the enabling level pulses in the light-emitting control signal corresponding to the first target subframe hm1 may be the same as the number of the enabling level pulses in the light-emitting control signal corresponding to the second target subframe hm2.

In the first target subframe hm1, a light-emitting control signal received by one pixel circuit in the partition F includes M1 enabling level pulses m. In the second target subframe hm2, a light-emitting control signal received by one pixel circuit in the partition F includes M1 enabling level pulses m. M1 is an integer greater than 1. A value of M1 may be flexibly determined according to actual situations, and is not limited in the embodiments of the present disclosure.

A pulse width W2 of the enabling level pulse m in the second target subframe hm2 may be different from a pulse width W1 of the enabling level pulse m in the first target subframe hm1.

Thus, requirements of duty ratio for different target subframes can be met by flexibly adjusting the pulse widths of the enabling level pulses in the light-emitting control signal, and duty ratios of the light-emitting control signals in the target subframes reach desired target duty ratios.

In some embodiments, in the first target subframe hm1, the duty ratio of the light-emitting control signal received by the pixel circuit in the partition F is a first duty ratio. In the second target subframe hm2, the duty ratio of the light-emitting control signal received by the pixel circuit in the partition F is the second duty ratio. That is, the duty ratio of the light-emitting control signal corresponding to the first target subframe hm1 is the first duty ratio, and the duty ratio of the light-emitting control signal corresponding to the second target subframe hm2 is the second duty ratio.

The first duty ratio may be less than the second duty ratio. For example, a light-emitting time period of a row of sub pixels in the partition F in the first target subframe hm1 may be less than a light-emitting time period of the row of the sub pixels in the partition F in the second target subframe hm2. Values of the first duty ratio and the second duty ratio may be flexibly determined according to actual situations, and are not limited in the embodiments of the present disclosure.

Accordingly, the pulse width W2 of the enabling level pulse m in the second target subframe hm2 may be greater than the pulse width W1 of the enabling level pulse m in the first target subframe hm1.

That is, in a case that the light-emitting control signal has a large duty ratio, a large pulse width may be set for the enabling level pulse m in the light-emitting control signal.

Thus, on the one hand, in a case that the light-emitting control signals respectively corresponding to different target subframes are different in duty ratio, by flexibly adjusting the pulse widths of the enabling level pulses in the light-emitting control signals in different target subframes, requirements of duty ratio for different target subframes can be met. For example, the duty ratio of the light-emitting control signal for the first target subframe reaches the desired first duty ratio, and the duty ratio of the light-emitting control signal for the second target subframe reaches the desired second duty ratio. On the other hand, the light-emitting control signals respectively corresponding to different target subframes are the same in the number of enabling level pulses, and in different target subframes, the light-emitting region is divided into a same number of partitions, which reduces the difficulty in controlling light emitting.

Figure 13:
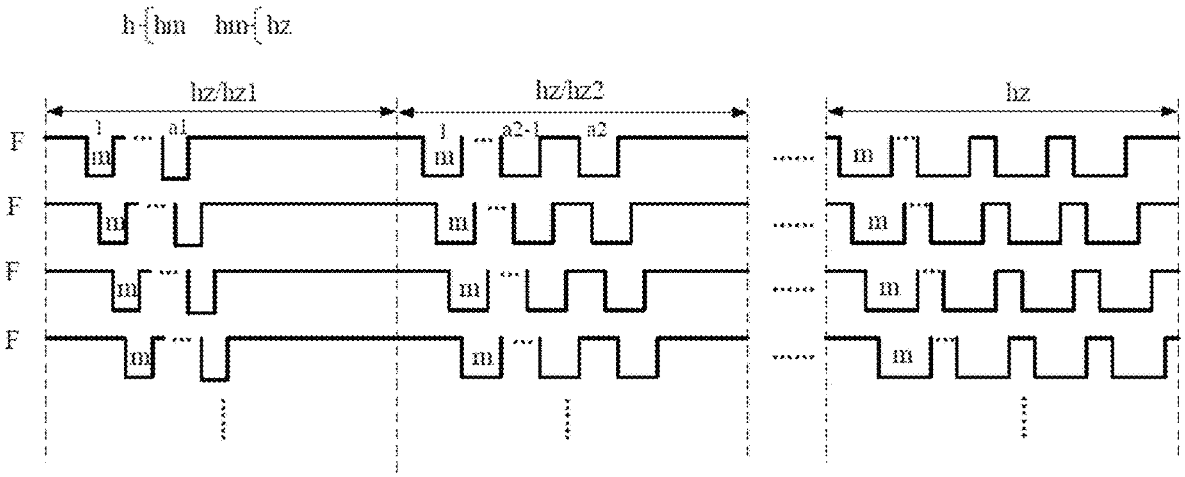
FIG. 13 is another schematic waveform diagram of a light-emitting control signal in a target subframe.

FIG. 13 is another schematic waveform diagram of a light-emitting control signal in the target subframe. As shown in FIG. 13, according to some embodiments of the present disclosure, the target subframe hm may include X different sub target subframes hz. The X sub target subframes hz are different subframes h, and X is an integer greater than or equal to 2. For example, the first target subframe described above may be regarded as a sub target subframe hz, and the second target subframe described above may also be regarded as a sub target subframe hz.

Among the X different sub target subframes hz, duty ratios of light-emitting control signals corresponding to at least two sub target subframes hz are within different duty ratio intervals. Different duty ratio intervals have different ranges. For example, multiple duty ratio intervals such as 10%-15%, 16%-20% may be preset. For example, in a case that a duty ratio of a light-emitting control signal corresponding to a sub target subframe hz is 12%, the duty ratio is within a duty ratio interval 10%-15%. For example, in a case that a duty ratio of a light-emitting control signal corresponding to a sub target subframe hz is 18%, the duty ratio is within a duty ratio interval 16%-20%. It should be noted that the above 12%, 18%, 10%-15% and 16%-20% are only examples and do not constitute a limitation of the present disclosure.

In some embodiments, the duty ratios of the light-emitting control signals corresponding to the X sub target subframes hz may be within different duty ratio intervals respectively. Apparently, duty ratios of light-emitting control signals corresponding to some sub target subframes hz may be within a same duty ratio interval, which is not limited in the embodiments of the present disclosure.

Different duty ratio intervals may correspond to different numbers of enabling level pulses. The number of enabling level pulses may be the number of enabling level pulses in a light-emitting control signal received by one pixel circuit in a partition F in a sub target subframe hz.

For example, in a case that a duty ratio of a light-emitting control signal corresponding to the sub target subframe hz1 is within a duty ratio interval A1, the light-emitting control signal received by one pixel circuit in the partition F in the sub target subframe hz1 may include a1 enabling level pulses m. In a case that a duty ratio of a light-emitting control signal corresponding to the sub target subframe hz2 is within a duty ratio interval A2, the light-emitting control signal received by one pixel circuit in the partition F in the sub target subframe hz2 may include a2 enabling level pulses m. $a1 \neq a2$, and a1 and a2 are integers greater than 1.

Thus, multiple different duty ratio intervals are preset, and the different duty ratio intervals correspond to different numbers of enabling level pulses. For each sub target subframe hz, the sub target subframe hz can rapidly determine the number of enabling level pulses corresponding to the sub target subframe hz based on a duty ratio interval within which a duty ratio of the light-emitting control signal is located. In a case that the light-emitting control signals corresponding to different target subframes are different in duty ratio, by flexibly adjusting the number of the enabling level pulses in the light-emitting control signal, requirements of duty ratio for different target subframes can be met. For example, the duty ratio of the light-emitting control signal for the target subframe reaches a desired target duty ratio.

Figure 14:
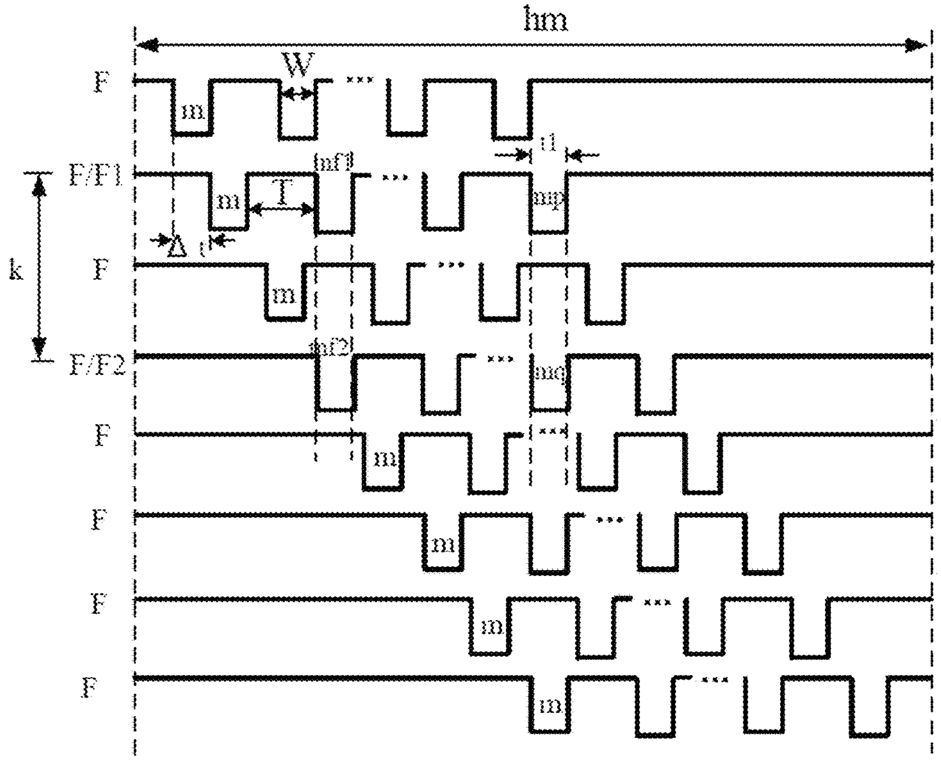
FIG. 14 is another schematic waveform diagram of a light-emitting control signal in a target subframe.

FIG. 14 is another schematic waveform diagram of a light-emitting control signal in the target subframe. As shown in FIG. 14, according to some embodiments of the present disclosure, in a same target subframe hm, enabling level pulses m for multiple partitions F may be the same in the pulse width W. In one embodiment, for any one of the multiple partitions F, M enabling level pulses m of a light-emitting control signal received by a pixel circuit in the partition F may be have a same pulse width W.

In this way, in a same target subframe hm, since enabling level pulses m for multiple partitions F are the same in the pulse width W, which is reflected in space and causes that different light-emitting partitions F (for example, the first partition F1 and the second partition F2) are the same in width along the first direction, and the light-emitting region is distributed more uniformly, to improve the display uniformity of the display panel.

Referring to FIG. 14, according to some embodiments of the present disclosure, in a same target subframe hm, multiple partitions F are the same in time interval T between two adjacent enabling level pulses m. In one embodiment, in a same target subframe hm, for any one of the multiple partitions F, there may be a same tine interval T between any two adjacent enabling level pulses m among M enabling level pulses in the light-emitting control signal received by the pixel circuit in the partition F.

Thus, in a same target subframe hm, multiple partitions F are the same in time interval T between two adjacent enabling level pulses m, which is reflected in space and causes that there is a same spacing between any two adjacent light-emitting partitions F, and the light-emitting region is distributed more uniformly, to improve the display uniformity of the display panel.

As shown in FIG. 8 and FIG. 14, each partition F may include at least one row of pixel circuits 80. One row of pixel circuits 80 may include at least one pixel circuit 80 arranged along the second direction X. The second direction X intersects the first direction Y. FIG. 8 shows that each partition F includes one row of pixel circuits 80.

According to some embodiments of the present disclosure, the time interval T may be determined according to the following equation:

$$\Delta t \times k = T \tag{1}$$

In the above equation, Δt represents a time difference between a start time instant of a first enabling level pulse ml in a light-emitting control signal received by an i-th row of pixel circuit and a start time instant of a first enabling level pulse ml in a light-emitting control signal received by an (i+1)-th row of the pixel circuit, in a same target subframe. i is a positive integer. For example, i may be equal to 1. k represents the number of rows of pixel circuits between two rows of sub pixels, where enabling level pulses for the two rows of sub pixels overlap in time. T represents the time interval.

Δt and k may be flexibly set according to actual situations. That is, Δt and k may be set in advance, which is not limited in the embodiments of the present disclosure. For example, the time interval T can be calculated according to the above equation (1) after determination of Δt and k.

As can be seen from FIG. 14, the time interval between two adjacent enabling level pulses m is set based on the time interval T calculated according to the equation (1). For example, a f1-th enabling level pulse mf1 for a j-th row of pixel circuit and a f2-th enabling level pulse mf2 for an s-th row of pixel circuit overlap at least partially in time. $j \neq s$, $f1 \neq f2$, and j, s, f1 and f2 are positive integers. The enabling level pulses m corresponding to the multiple partitions F are the same in pulse width W, and the multiple partitions F are the same in time interval T between two adjacent enabling level pulses m, and a (f1+n)-th enabling level pulse mf1+n for the j-th row of pixel circuit and a (f2+n)-th enabling level pulse mf2+n for the s-th row of pixel circuit overlap at least partially in time, and N is a positive integer, and to ensure that at least two partitions F emit light during a same time period.

Figure 15:
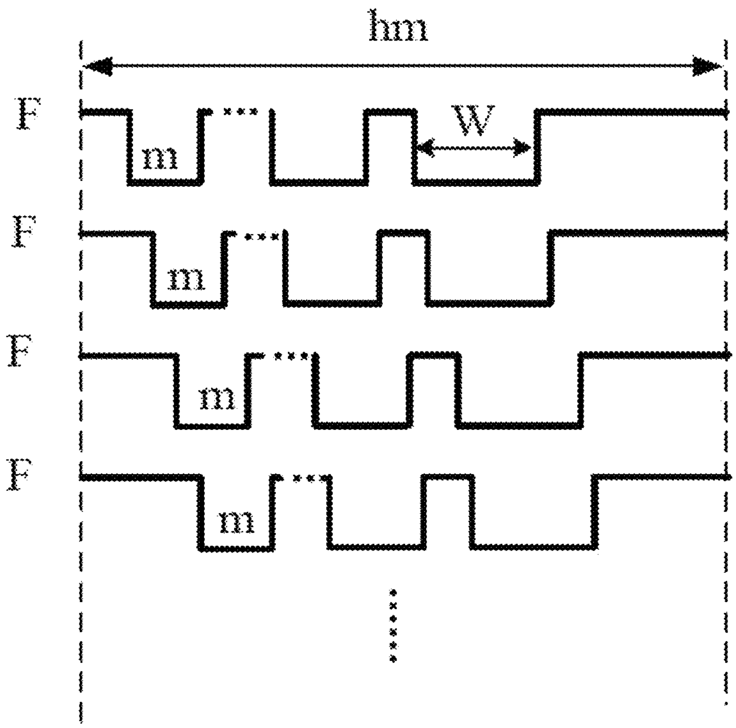
FIG. 15 is another schematic waveform diagram of a light-emitting control signal in a target subframe.

FIG. 15 is another schematic waveform diagram of a light-emitting control signal in the target subframe. As shown in FIG. 15, according to some embodiments of the present disclosure, in a same target subframe hm, for each partition F, M enabling level pulses m in a light-emitting control signal received by a pixel circuit in the partition F may be different in pulse width w. For example, pulse widths W of the M enabling level pulses m may be in an ascending order or a descending order. For another example, among the M enabling level pulses m, a pulse width W of an odd-number-th enabling level pulse m may be a first pulse width, a pulse width W of an even-number-th enabling level pulse m may be a second pulse width, and the first pulse width is different from the second pulse width. There are many implementations of the pulse widths W of the M enabling level pulses m, which are not listed here.

In this way, the pulse widths W of the M enabling level pulses m in the light-emitting control signal received by the pixel circuit in the partition F may be flexibly adjusted to cause the duty ratio of the light-emitting control signal to reach a desired target duty ratio.

Figure 16:
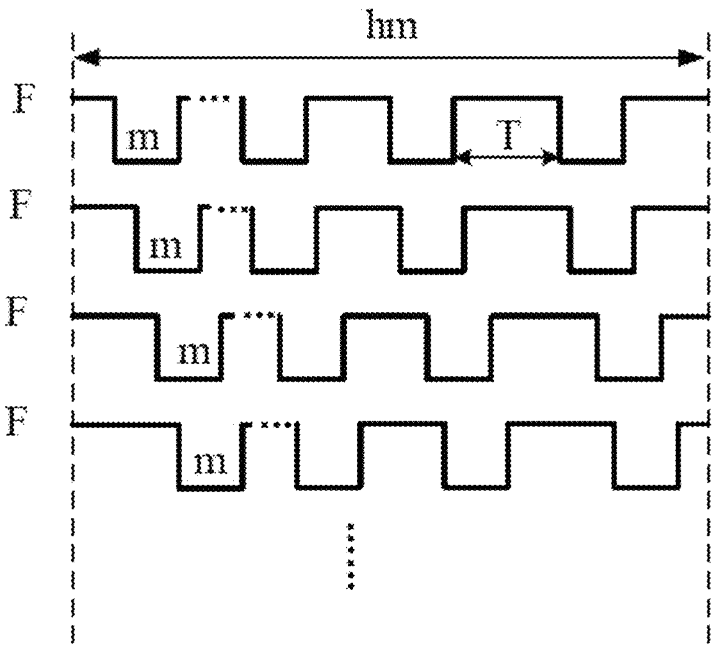
FIG. 16 is another schematic waveform diagram of a light-emitting control signal in a target subframe.

FIG. 16 is another schematic waveform diagram of a light-emitting control signal in the target subframe. As shown in FIG. 16, according to some embodiments of the present disclosure, in a same target subframe hm, for each partition F, time intervals T between each two adjacent enabling level pulses m of the M enabling level pulses m in a light-emitting control signal received by a pixel circuit in the partition F may be different. For example, the time intervals T between two adjacent enabling level pulses m among the M enabling level pulses m may be in an ascending order or a descending order. For another example, among (M−1) time intervals T corresponding to the M enabling level pulses m, an odd-number-th time interval T may be a first time interval, an even-number-th time interval T may be a second time interval, and the first time interval is different from the second time interval. There are many implementations of time intervals T between two adjacent enabling level pulses m among the M enabling level pulses m, which are not listed here.

Thus, by adjusting the time interval T between two adjacent enabling level pulses m among the M enabling level pulses m, spacing between the two adjacent light-emitting partitions can be flexibly adjusted to meet requirements in different situations.

Figure 17:
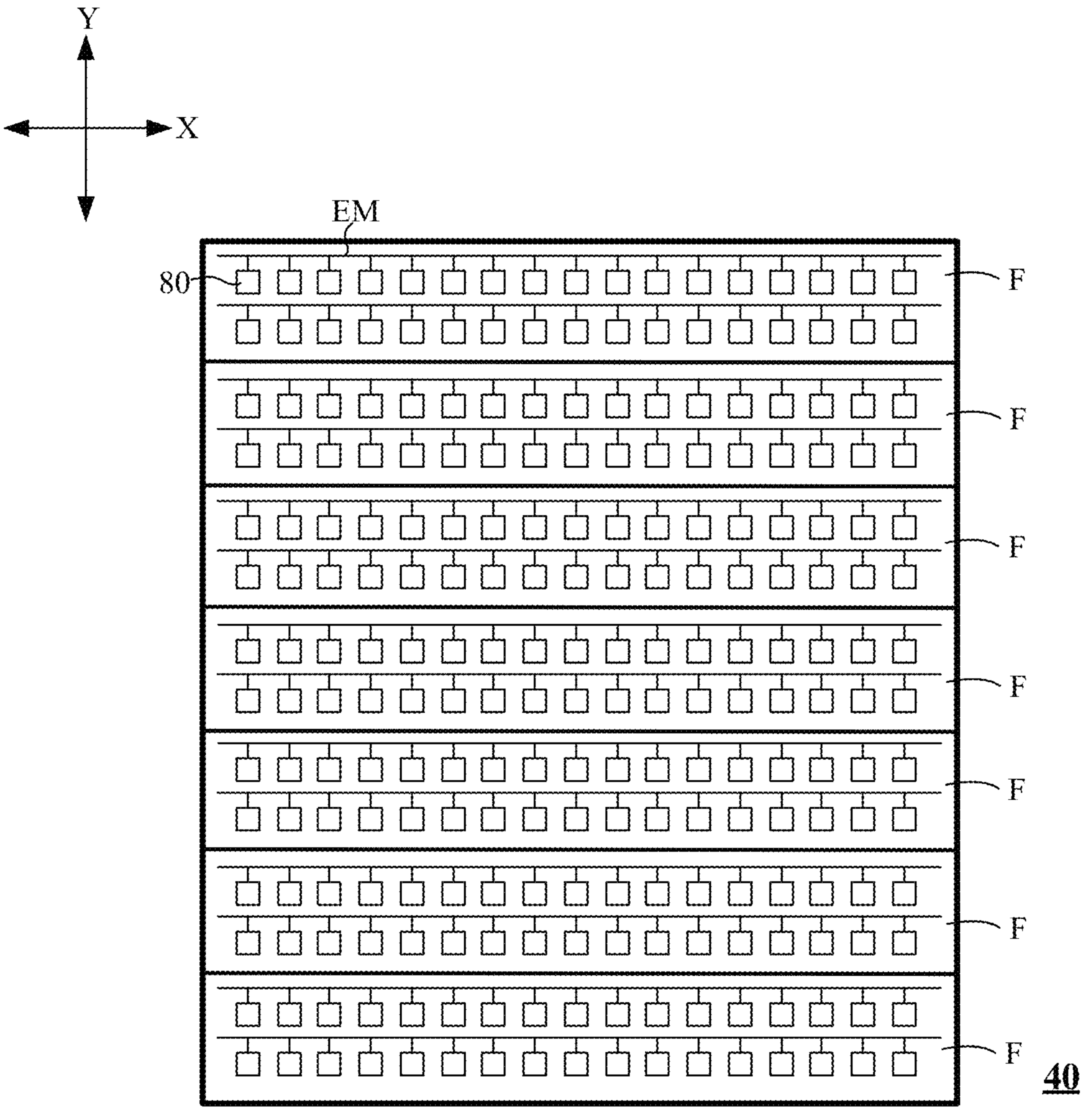
FIG. 17 is a schematic structural diagram of a display panel according to another embodiment of the present disclosure.

FIG. 17 is a schematic structural diagram of a display panel according to another embodiment of the present disclosure. As shown in FIG. 17, according to some embodiments of the present disclosure, each partition F includes at least two rows of pixel circuits 80. FIG. 17 shows that each partition F includes two rows of pixel circuits 80 as an example. Each row of pixel circuits 80 may include at least one pixel circuit 80 arranged along the second direction X. The second direction X intersects the first direction Y. Each row of pixel circuits 80 may be electrically connected to one light-emitting control signal line EM, and one light-emitting control signal line EM provides a light-emitting control signal for one row of pixel circuits 80.

Figure 18:
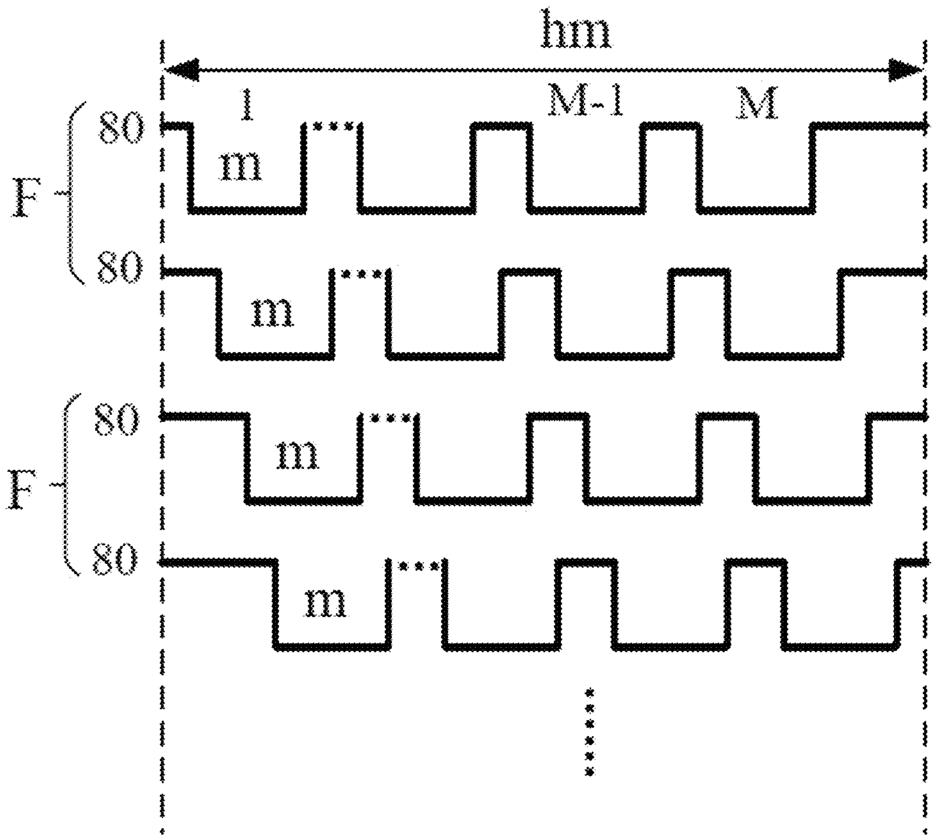
FIG. 18 is another schematic waveform diagram of a light-emitting control signal in a target subframe.

FIG. 18 is another schematic waveform diagram of a light-emitting control signal in the target subframe. As shown in FIG. 17 and FIG. 18, a row of light-emitting control signals in FIG. 18 refers to light-emitting control signals received by a row of pixel circuits. A k-th enabling level pulse m in a light-emitting control signal received by one of two adjacent rows of pixel circuits in a partition F and a k-th enabling level pulse m in a light-emitting control signal received by the other of the two adjacent rows of pixel circuits in the partition F overlap at least partially in time, where $1 \leq k \leq m$, and k is an integer.

For example, a first enabling level pulse m in a light-emitting control signal received by a first row of pixel circuits 80 in a partition F and a first enabling level pulse m in a light-emitting control signal received by a second row of pixel circuits 80 in the partition F overlap at least partially in time. A second enabling level pulse m in a light-emitting control signal received by a first row of pixel circuits 80 in a partition F and a second enabling level pulse m in a light-emitting control signal received by a second row of pixel circuits 80 in the partition F overlap at least partially in time . . . . An M-th enabling level pulse m in a light-emitting control signal received by a first row of pixel circuits 80 in a partition F and an M-th enabling level pulse m in a light-emitting control signal received by a second row of pixel circuits 80 in the partition F overlap at least partially in time.

In this way, for each of the partitions F, sub pixels corresponding to a next row of pixel circuits are lit each time sub pixels corresponding to a current row of pixel circuits emit light, and brightness jump can be avoided, which realizes smooth transition of brightness, to improve a display quality.

Figure 19:
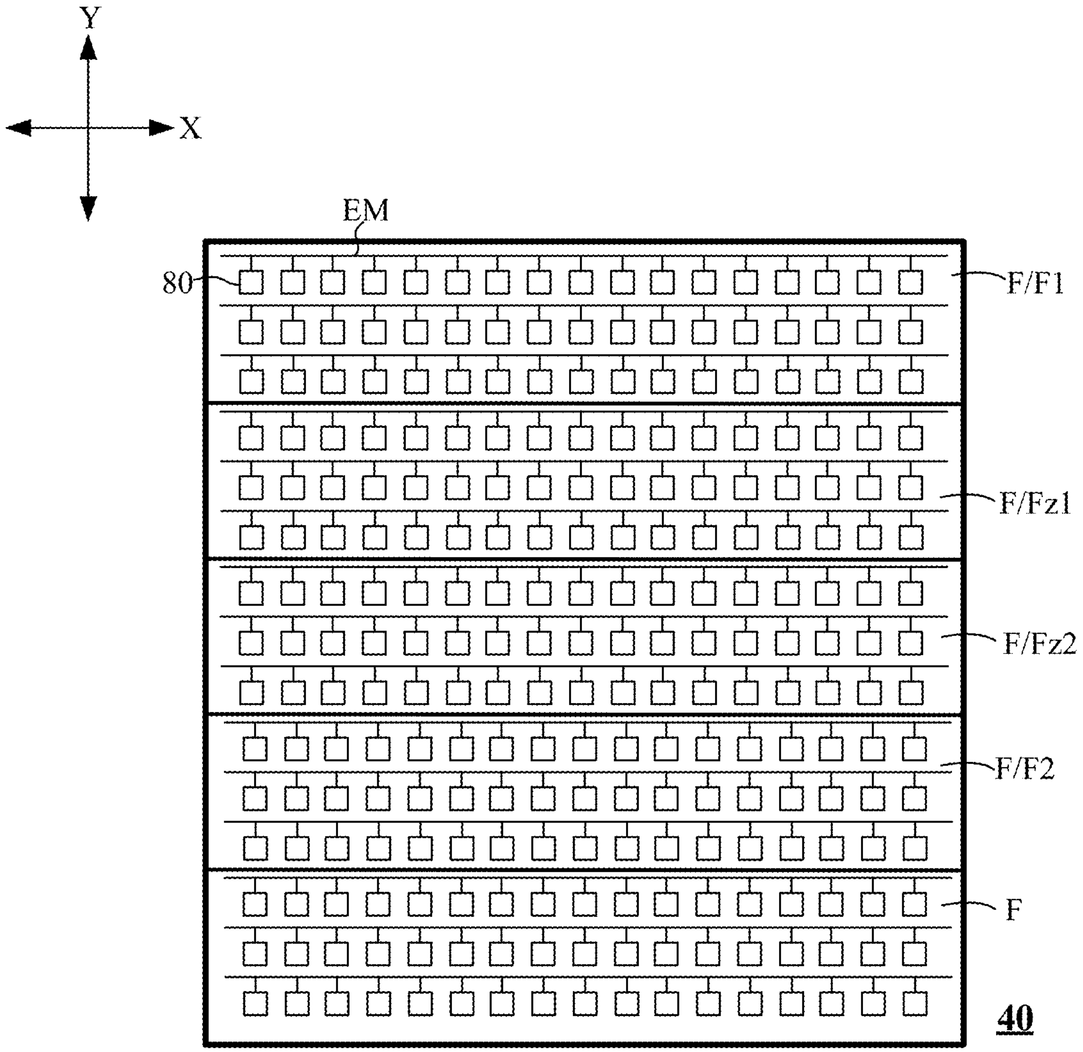
FIG. 19 is a schematic structural diagram of a display panel according to another embodiment of the present disclosure.

FIG. 19 is a schematic structural diagram of a display panel according to another embodiment of the present disclosure. As shown in FIG. 19, according to some embodiments of the present disclosure, each partition F may include at least one row of pixel circuits 80. FIG. 19 shows that each partition F includes three rows of pixel circuits 80 as an example. Each row of pixel circuits 80 may include at least one pixel circuit 80 arranged along the second direction X. The second direction intersects the first direction Y. Each row of pixel circuits 80 may be electrically connected to one light-emitting control signal line EM, and one light-emitting control signal line EM provides a light-emitting control signal for one row of pixel circuits 80.

The multiple partitions F may include a first sub partition Fz1 and a second sub partition Fz2. The first sub partition Fz1 and the second sub partition Fz2 are adjacent different partitions F. It should be noted that, for simplicity, FIG. 19 shows the first sub partition Fz1 and the second sub partition Fz2 with two adjacent partitions F as an example. However, the first sub partition Fz1 may be any partition, for example, a partition F other than the last partition Fe, and the second sub partition Fz2 may be a partition F adjacent to the first sub partition Fz1.

Figure 20:
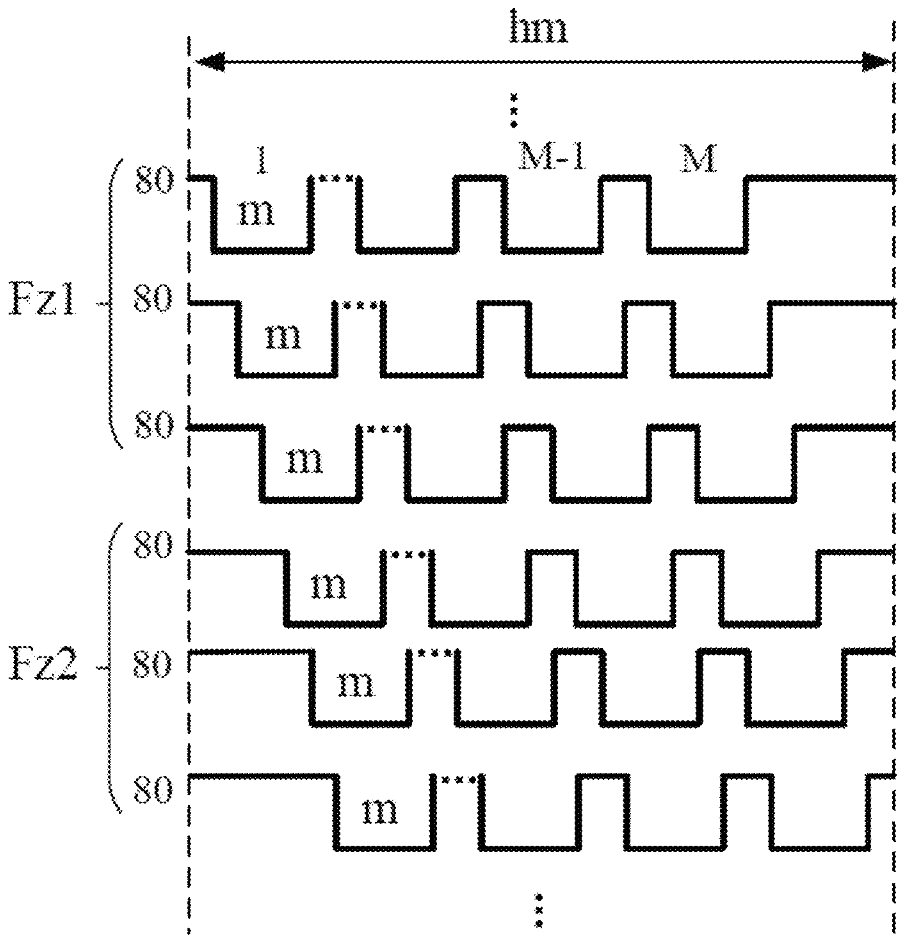
FIG. 20 is another schematic waveform diagram of a light-emitting control signal in a target subframe.

FIG. 20 is another schematic waveform diagram of a light-emitting control signal in the target subframe. As shown in FIG. 19 and FIG. 20, one row of light-emitting control signals in FIG. 20 refers to light-emitting control signals received by one row of pixel circuits 80. According to some embodiments of the present disclosure, a k-th enabling level pulse m in the light-emitting control signal received by a last row of pixel circuits in the first sub partition Fz1 and a k-th enabling level pulse m in the light-emitting control signal received by a first row of pixel circuits in the second sub partition Fz2 overlap at least partially in time. $1 \leq k \leq M$, and k is an integer.

For example, a first enabling level pulse m in the light-emitting control signal received by the last row of pixel circuits 80 in the first sub partition Fz1 and a first enabling level pulse m in the light-emitting control signal received by a first row of pixel circuits 80 in the second sub partition Fz2 overlap at least partially in time. A second enabling level pulse m in the light-emitting control signal received by the last row of pixel circuits 80 in the first sub partition Fz1 and a second enabling level pulse m in the light-emitting control signal received by the first row of pixel circuits 80 in the second sub partition Fz2 overlap at least partially in time . . . . An M-th enabling level pulse m in the light-emitting control signal received by the last row of pixel circuits 80 in the first sub partition Fz1 and an M-th enabling level pulse m in the light-emitting control signals received by the first row of pixel circuits 80 in the second sub partition Fz2 overlap at least partially in time.

In this way, the sub pixels corresponding to the first row of pixel circuits in the second sub partition Fz2 are lit when the sub pixels corresponding to the last row of pixel circuits in the first sub partition Fz1 emit light, and brightness jump can be avoided during switch between partitions, and to realize smooth transition of brightness between different partitions, to improve the display quality.

Referring to FIG. 19, according to some embodiments of the present disclosure, each partition F may include multiple rows of pixel circuits 80. FIG. 19 shows that each partition F includes three rows of pixel circuits 80 as an example. Different partitions F may be the same or different in the number of rows of pixel circuits 80 included in the partition F, which is not limited in the embodiments of the present disclosure. Each row of pixel circuits 80 may include at least one pixel circuit 80 arranged along the second direction X. The second direction X intersects the first direction Y. Each row of pixel circuits 80 may be electrically connected to one light-emitting control signal line EM, and one light-emitting control signal line EM provides a light-emitting control signal for one row of pixel circuits 80.

The first partition F1 may include Z1 rows of pixel circuits 80 for receiving Z1 light-emitting control signals. Each row of pixel circuits 80 receives one light-emitting control signal. In the target subframe, each light-emitting control signal may include M enabling level pulses, and M is an integer greater than 1.

Figure 21:
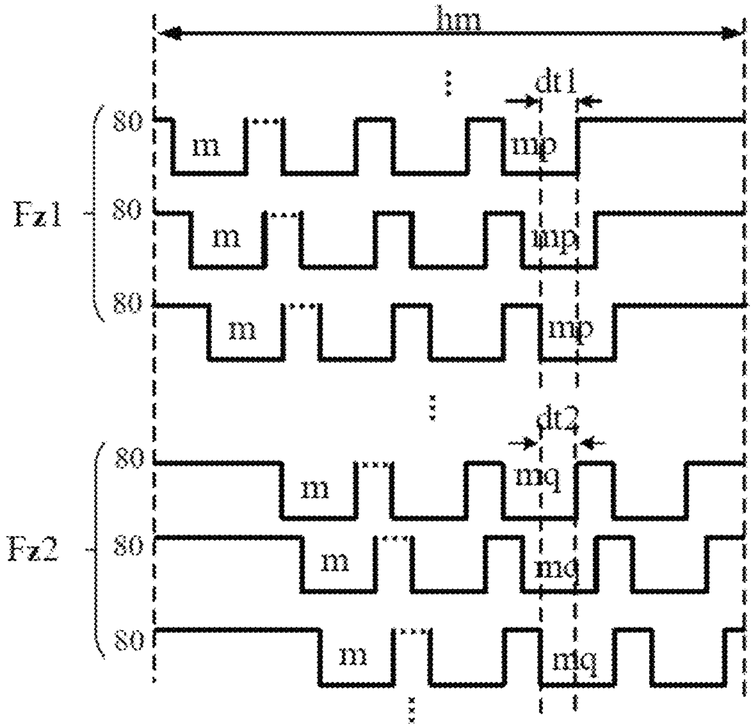
FIG. 21 is another schematic waveform diagram of a light-emitting control signal in a target subframe.

FIG. 21 is another schematic waveform diagram of a light-emitting control signal in the target subframe. As shown in FIG. 20 and FIG. 21, according to some embodiments of the present disclosure, p-th enabling level pulses mp in Z1 light-emitting control signals received by the first partition F1 overlap during a first time period dt1.

The second partition F2 may include Z2 rows of pixel circuits 80 for receiving Z2 light-emitting control signals. Each row of pixel circuits 80 receives one light-emitting control signal. In the target subframe, each light-emitting control signal may include M enabling level pulses, and M is an integer greater than 1. q-th enabling level pulses mq in Z2 light-emitting control signals received by the second partition F2 overlap during a second time period dt2. Z1 and Z2 are integers greater than 1. Z1 and Z2 may be the same or different, which is not limited in the embodiments of the present disclosure. For example, in the embodiments shown in FIG. 20 and FIG. 21, both Z1 and Z2 may be equal to 3.

As shown in FIG. 21, the first time period dt1 and the second time period dt2 may overlap at least partially.

Thus, the first time period dt1 and the second time period dt2 overlap at least partially, and both the sub pixels corresponding to the Z1 rows of pixel circuits 80 in the first partition F1 and the sub pixels corresponding to the Z2 rows of pixel circuits 80 in the second partition F2 can emit light during a time period when the first time period dt1 and the second time period dt2 overlap.

Figure 22:
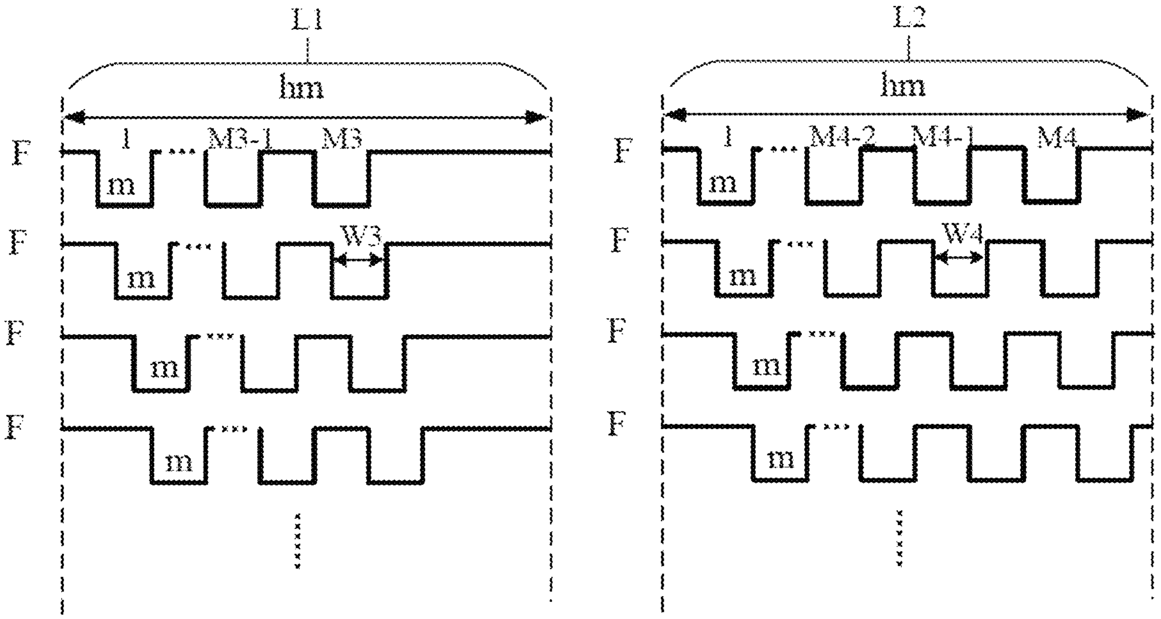
FIG. 22 is another schematic waveform diagram of a light-emitting control signal in a target subframe.

FIG. 22 is another schematic waveform diagram of a light-emitting control signal in the target subframe. As shown in FIG. 22, according to some embodiments of the present disclosure, M may include M3 or M4.

In a case of a first brightness level L1, in the target subframe hm, a light-emitting control signal received by one pixel circuit in a partition F may include M3 enabling level pulses m.

In a case of a second brightness level L2, in the target subframe hm, a light-emitting control signal received by one pixel circuit in a partition F may include M4 enabling level pulses m.

The first brightness level is different from the second brightness level. That is, the brightness of the display panel displaying at the first brightness level may be different from the brightness of the display panel displaying at the second brightness level. Accordingly, M3≠M4. Values of M3 and M4 may be flexibly determined according to actual situations, which is not limited in the embodiments of the present disclosure.

In this way, by flexibly adjusting the number of enabling level pulses in the light-emitting control signal at different brightness levels, the duty ratio of the light-emitting control signal can be adjusted to meet brightness requirements at different brightness levels, and desired target brightness at various brightness levels can be reached.

Referring to FIG. 22, according to some embodiments of the present disclosure, a pulse width W4 of enabling level pulses m corresponding to the second brightness level L2 may be the same as a pulse width W3 of enabling level pulses m corresponding to the first brightness level L1.

In this way, only by flexibly adjusting the number of enabling level pulses in the light-emitting control signal, the duty ratio of the light-emitting control signal can be adjusted to meet brightness requirements at different brightness levels without adjusting the pulse width of the enabling level pulse in the light-emitting control signal, to reduce the complexity of the light-emitting control signal.

Figure 23:
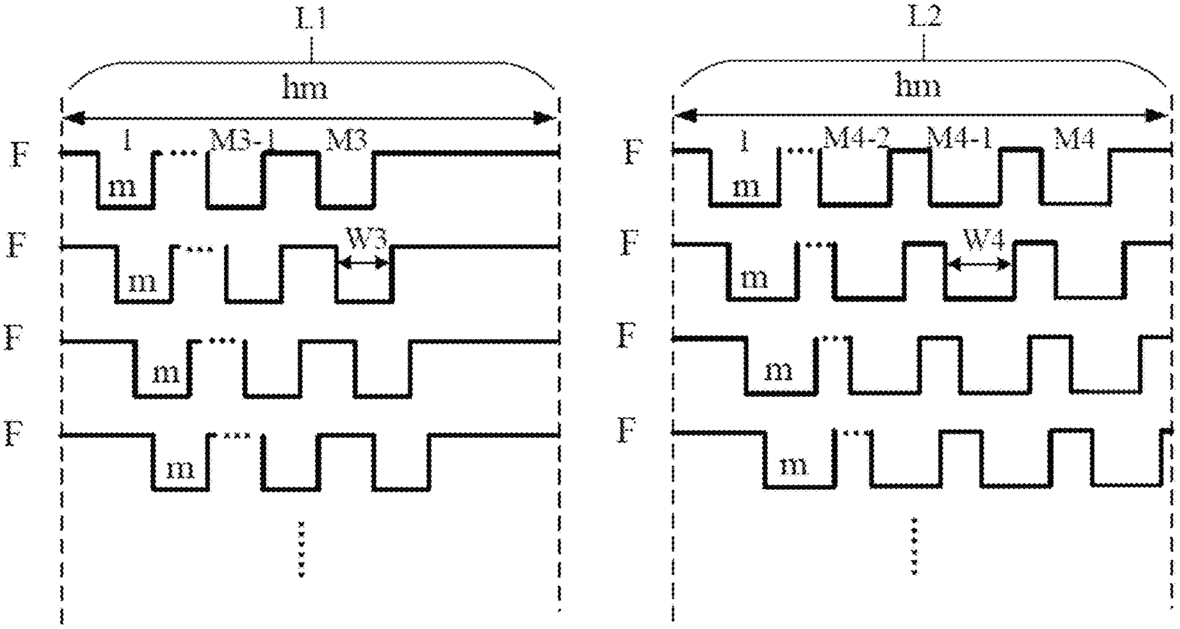
FIG. 23 is another schematic waveform diagram of a light-emitting control signal in a target subframe.

FIG. 23 is another schematic waveform diagram of a light-emitting control signal in the target subframe. As shown in FIG. 23, according to other embodiments of the present disclosure, the pulse width W4 of the enabling level pulse m corresponding to the second brightness level L2 may be different from the pulse width W3 of the enabling level pulse m corresponding to the first brightness level L1.

Thus, by flexibly adjusting the number of enabling level pulses in the light-emitting control signal and the pulse width of the enabling level pulse in the light-emitting control signal, the duty ratio of the light-emitting control signal can be adjusted to meet brightness requirements at different brightness levels.

Referring to FIG. 22 or FIG. 23, in some specific embodiments, the second brightness level L2 may be greater than the first brightness level L1. That is, the brightness of the display panel displaying at the second brightness level may be higher than the brightness of the display panel displaying at the first brightness level. Accordingly, M4 may be greater than M3.

In this way, in a case that a brightness level corresponds to high brightness, the duty ratio of the light control signal can be increased by increasing the number of enabling level pulses in the light control signal, and to meet brightness requirements at different brightness levels. For example, the first brightness level reaches a desired first target brightness level, the second brightness level reaches a desired second target brightness level, and the second target brightness level is greater than the first target brightness level.

Referring to FIG. 23, in a case that the second brightness level L2 is greater than the first brightness level L1, the pulse width W4 of the enabling level pulse m corresponding to the second brightness level L2 may be greater than or equal to the pulse width W3 of the enabling level pulse m corresponding to the first brightness level L1.

That is, in a case that a brightness level corresponds to high brightness, the pulse width of the enabling level pulse m in the light-emitting control signal may be set large.

In this way, in a case that a brightness level corresponds to high brightness, on the basis of increasing the number of enabling level pulses in the light-emitting control signal, by increasing the pulse width of the enabling level pulse in the light-emitting control signal, it can be ensured that the duty ratio of the light-emitting control signal reaches a target duty ratio, and to meet brightness requirements at different brightness levels. For example, the second brightness level reaches a desired second target brightness level.

Figure 24:
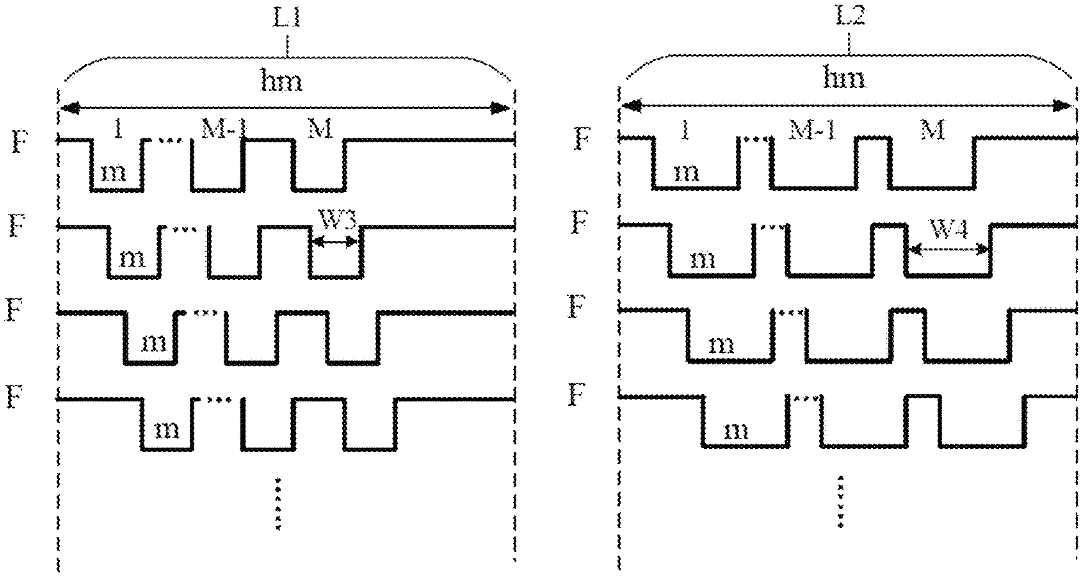
FIG. 24 is another schematic waveform diagram of a light-emitting control signal in a target subframe.

FIG. 24 is another schematic waveform diagram of a light-emitting control signal in the target subframe. The embodiment shown in FIG. 24 is different from the embodiment shown in FIG. 22 in that the number of the enabling level pulses in the light-emitting control signal corresponding to the first brightness level may be the same as the number of the enabling level pulses in the light-emitting control signal corresponding to the second brightness level.

At the first brightness level L1, in the target subframe hm, the light-emitting control signal received by one pixel circuit in a partition F includes M enabling level pulses m. At the second brightness level L2, in the target subframe hm, the light-emitting control signal received by one pixel circuit in the partition F includes M enabling level pulses m.

The first brightness level L1 is different from the second brightness level L2. That is, the brightness of the display panel displaying at the first brightness level may be different from the brightness of the display panel displaying at the second brightness level. Accordingly, the pulse width W3 of the enabling level pulse m in the light-emitting control signal corresponding to the first brightness level L1 may be different from the pulse width W4 of the enabling level pulse m in the light-emitting control signal corresponding to the second brightness level L2.

In this way, by flexibly adjusting the pulse widths of enabling level pulses in the light-emitting control signals at different brightness levels, the duty ratio of the light-emitting control signal can be adjusted to meet brightness requirements at different brightness levels, and desired target brightness at various brightness levels can be reached.

Referring to FIG. 24, in some embodiments, the second brightness level L2 may be greater than the first brightness level L1. That is, the brightness of the display panel displaying at the second brightness level L2 may be higher than the brightness of the display panel displaying at the first brightness level L1. Accordingly, the pulse width W4 of the enabling level pulse m corresponding to the second brightness level L2 may be greater than the pulse width W3 of the enabling level pulse m corresponding to the first brightness level L1.

In this way, in a case that a brightness level corresponds to high brightness, the duty ratio of the light control signal can be increased by increasing the pulse width of the enabling level pulse in the light control signal, and to meet brightness requirements at different brightness levels. For example, the first brightness level reaches a desired first target brightness level, the second brightness level reaches a desired second target brightness level, and the second target brightness level is greater than the first target brightness level.

Figure 25:
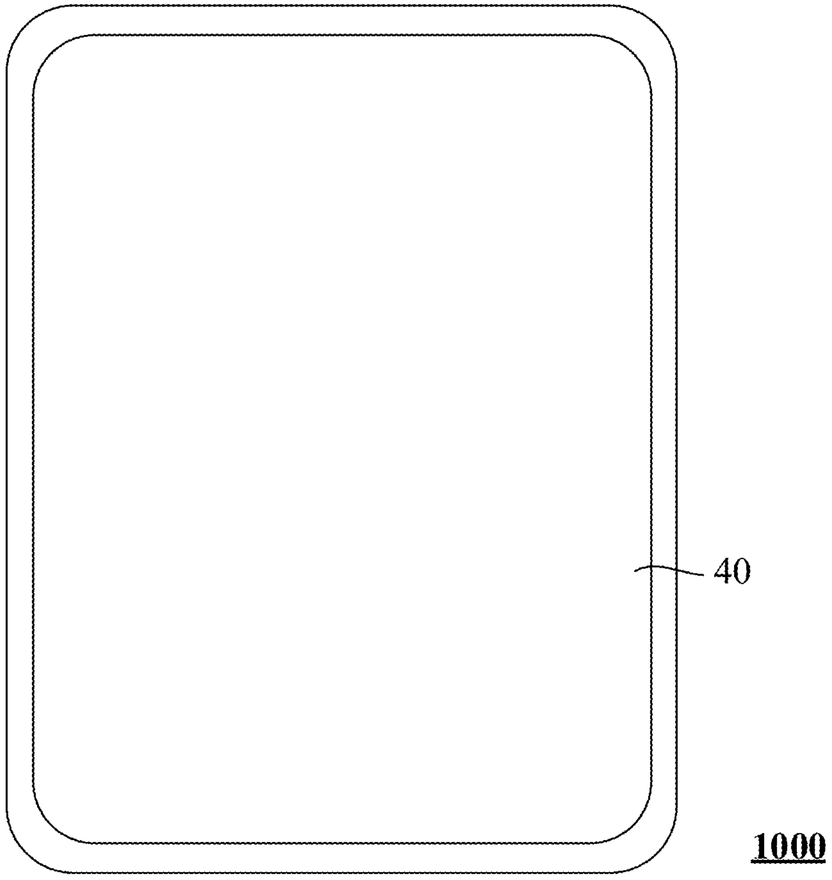
FIG. 25 is a schematic structural diagram of a display device according to an embodiment of the present disclosure.

A display device is further provided according to the present disclosure based on the display panel according to the above embodiments. The display device includes the display panel according to the present disclosure. FIG. 25 is a schematic structural diagram of a display device according to an embodiment of the present disclosure. A display device 1000 show in FIG. 25 includes the display panel 40 according to any one of the above embodiments of the present disclosure. In the embodiment shown in FIG. 25, a mobile phone is taken as an example to describe the display device 1000. It should be understood that the display device according to the embodiments of the present disclosure may be a wearable product, a computer, a television, a vehicle-mounted display device or other display device with a display function, which is not limited in the present disclosure. The display device according to the embodiments of the present disclosure has the beneficial effects of the display panel 40 according to the embodiments of the present disclosure. For the beneficial effects, one may refer to the details of the description of the display panel 40 in the above embodiments, and the beneficial effects are not repeated here.

It should be understood that the top view of the display panel and the timing of the display panel in the drawings of the embodiments of the present disclosure are only some examples and are not intended to limit the present disclosure. In addition, the above embodiments according to the present disclosure can be combined with each other in a case of no contradiction.

It should be understood that the above embodiments in the specification are described in a progressive manner, references may be made among these embodiments with respect to the same or similar parts among these embodiments, and each of the embodiments is mainly focused on describing its differences from other embodiments. The embodiments according to the present disclosure are described above in which not all the details are described, and are not intended to limit the present disclosure. Apparently, many modifications and variations can be made based on the above description. These embodiments are selected and described in detail in this specification for explaining the principles and practical applications of the present disclosure. The present disclosure is limited by only the claims and their equivalents.

Different features in different embodiments may be combined to achieve beneficial effects. Other variations to the disclosed embodiments may be understood and implemented upon studying the drawings, the specification, and the claims. In the claims, the term "comprise" does not exclude other structures, the indefinite article "a/an" does not exclude a plurality, and the terms "first" and "second" are used to indicate names rather than any particular order. Any reference numerals in the claims should not be construed as a limitation of the protection scope of the present disclosure. The presence of various features in different subordinate claims does not mean that these features cannot be combined to achieve beneficial effects.

What is claimed is:

1. A display panel, wherein one screen display period of the display panel comprises N subframes, and at least one subframe among the N subframes serves as a target subframe;

the display panel comprises a plurality of partitions arranged along a first direction, the partition comprises at least one pixel circuit; in the target subframe, a light-emitting control signal received by one pixel circuit in the partition comprises M enabling level pulses, wherein M is an integer greater than 1;

the plurality of partitions comprise a first partition and a second partition; in the target subframe, a p-th enabling level pulse in a light-emitting control signal received by a pixel circuit in the first partition at least partially overlaps with a q-th enabling level pulse in a light-emitting control signal received by a pixel circuit in the second partition in time, wherein $p \neq q$, $1 \leq p \leq M$, $1 \leq q \leq M$, and p and q are integers, and the plurality of partitions comprise a third partition, and the first partition and the second partition are separated by the third partition; and in the target subframe, all of M enabling level pulses in a light-emitting control signal received by a pixel circuit in the third partition do not overlap with the p-th enabling level pulse in the light-emitting control signal received by the pixel circuit in the first partition in time.

2. The display panel according to claim 1, wherein the plurality of partitions comprise at least one fourth partition;

a time period during which the p-th enabling level pulse overlaps with the q-th enabling level pulse is a target time period; and in the target time period, one of enabling level pulses in a light emission control signal received by a pixel circuit in the fourth partition at least partially overlaps with the p-th enabling level pulse in time.

3. The display panel according to claim 2, wherein along the first direction, the fourth partition is arranged on a side, of the second partition, away from the first partition, and a minimum spacing between the first partition and the second partition is the same as a minimum spacing between the second partition and the fourth partition.

4. The display panel according to claim 3, wherein the partition comprises at least one row of pixel circuits, and the number of rows of pixel circuits between the first partition and the second partition is the same as the number of rows of pixel circuits between the second partition and the fourth partition.

5. The display panel according to claim 2, wherein the plurality of partitions comprise a plurality of fourth partitions, and two adjacent fourth partitions among the plurality of fourth partitions are separated by at least one partition; and in the target time period, the enabling level pulses, in different fourth partitions, that at least partially overlap with the p-th enabling level pulse in time have different sequence numbers.

6. The display panel according to claim 1, wherein at least one subframe among the N subframes serves as a fixed target subframe;

in the fixed target subframe, a light-emitting control signal received by a pixel circuit in the partition comprises one enabling level pulse, and a duty ratio of the light-emitting control signal received by the pixel circuit in the partition is less than a first preset threshold; and in the fixed target subframe, the plurality of partitions successively receive the enabling level pulse.

7. The display panel according to claim 1, wherein the target subframes comprise a first target subframe and a second target subframe, and the first target subframe and the second target subframe are different subframes;

in the first target subframe, a duty ratio of a light-emitting control signal received by a pixel circuit in the partition is a first duty ratio, and a light-emitting control signal received by one pixel circuit in the partition comprises M1 enabling level pulses; and in the second target subframe, a duty ratio of a light-emitting control signal received by the pixel circuit in the partition is a second duty ratio, a light-emitting control signal received by one pixel circuit in the partition comprises M2 enabling level pulses, wherein the first duty ratio is different from the second duty ratio, wherein $M1 \neq M2$, and M1 and M2 are integers greater than 1.

8. The display panel according to claim 7, wherein a pulse width of the enabling level pulse in the second target subframe is the same as a pulse width of the enabling level pulse in the first target subframe, or the pulse width of the enabling level pulse in the second target subframe is different from the pulse width of the enabling level pulse in the first target subframe.

9. The display panel according to claim 1, wherein the target subframes comprise a first target subframe and a second target subframe; in the first target subframe, a light-emitting control signal received by one pixel circuit in the partition comprises M1 enabling level pulses;

in the second target subframe, a light emission control signal received by one pixel circuit in the partition comprises M1 enabling level pulses, and M1 is an integer greater than 1; and a pulse width of the enabling level pulse in the second target subframe is different from a pulse width of the enabling level pulse in the first target subframe.

10. The display panel according to claim 9, wherein in the first target subframe, a duty ratio of the light emission control signal received by the pixel circuit in the partition is a first duty ratio;

in the second target subframe, a duty ratio of the light emission control signal received by the pixel circuit in the partition is a second duty ratio; and the first duty ratio is less than the second duty ratio, and the pulse width of the enabling level pulse in the second target subframe is greater than the pulse width of the enabling level pulse in the first target subframe.

11. The display panel according to claim 1, wherein the target subframes comprise X different sub target subframes, and the X sub target subframes are different subframes, wherein X is an integer greater than or equal to 2; and duty ratios of light-emitting control signals corresponding to at least two of the sub target subframes are within different duty ratio intervals, different duty ratio intervals correspond to different numbers of enabling level pulses, wherein the number of the enabling level pulses is the number of the enabling level pulses in the light-emitting control signal received by one pixel circuit in the partition in one of the sub target subframes.

12. The display panel according to claim 1, wherein the enabling level pulses for the plurality of partitions are the same in pulse width; and/or the plurality of partitions are the same in time interval between two adjacent enabling level pulses.

13. The display panel according to claim 1, wherein the M enabling level pulses are different in pulse width; and/or time intervals between each two adjacent enabling level pulses of the M enabling level pulses are different.

14. The display panel according to claim 1, wherein the partition comprises at least two rows of pixel circuits, one row of pixel circuits comprises at least one pixel circuit arranged along a second direction, and the second direction intersects the first direction; and k-th enabling level pulses in light-emitting control signals received by two adjacent rows of pixel circuits in a same partition at least partially overlap in time, wherein $1 \leq k \leq M$, and k is an integer.

15. The display panel according to claim 1, wherein the partition comprises at least one row of pixel circuit, and one row of pixel circuits comprises at least one pixel circuit arranged along a second direction, and the second direction intersects the first direction;

the plurality of partitions comprise a first sub partition and a second sub partition, and the first sub partition and the second sub partition are adjacent different partitions; and a k-th enabling level pulse in a light-emitting control signal received by each of a last row of pixel circuits in the first sub partition at least partially overlaps with a k-th enabling level pulse in a light-emitting control signal received by each of a first row of pixel circuits in the second sub partition in time, wherein $1 \leq k \leq M$, and k is an integer.

16. The display panel according to claim 1, wherein the partition comprises a plurality of rows of pixel circuits, and one row of pixel circuits comprises at least one pixel circuit arranged along a second direction, and the second direction intersects the first direction;

the first partition comprises Z1 rows of pixel circuits, the Z1 rows of pixel circuits receive Z1 light-emitting control signals, one row of pixel circuits receives one light-emitting control signal, and p-th enabling level pulses in the Z1 light-emitting control signals overlap during a first time period;

the second partition comprises Z2 rows of pixel circuits, the Z2 rows of pixel circuits receive Z2 light-emitting control signals, one row of pixel circuits receives one light-emitting control signal, and q-th enabling level pulses in the Z2 light-emitting control signals overlap during a second time period, wherein Z1 and Z2 are integers greater than 1; and the first time period at least partially overlaps with the second time period.

17. The display panel according to claim 1, wherein a pulse width of the enabling level pulse corresponding to a second brightness level is different from a pulse width of the enabling level pulse corresponding to a first brightness level, or the pulse width of the enabling level pulse corresponding to the second brightness level is the same as the pulse width of the enabling level pulse corresponding to the first brightness level.

18. The display panel according to claim 1, wherein at a first brightness level, in the target subframe, a light-emitting control signal received by one pixel circuit in the partition comprises M enabling level pulses;

at a second brightness level, in the target subframe, a light emission control signal received by one pixel circuit in the partition comprises M enabling level pulses; and the first brightness level is different from the second brightness level, and a pulse width of the enabling level pulse of the light-emitting control signal at the first brightness level is different from a pulse width of the enabling level pulse of the light-emitting control signal at the second brightness level.

19. A display device comprising a display panel, wherein one screen display period of the display panel comprises N subframes, and at least one subframe among the N subframes serves as a target subframe;

the display panel comprises a plurality of partitions arranged along a first direction, the partition comprises at least one pixel circuit; in the target subframe, a light-emitting control signal received by one pixel circuit in the partition comprises M enabling level pulses, wherein M is an integer greater than 1;

the plurality of partitions comprise a first partition and a second partition; in the target subframe, a p-th enabling level pulse in a light-emitting control signal received by a pixel circuit in the first partition at least partially overlaps with a q-th enabling level pulse in a light-emitting control signal received by a pixel circuit in the second partition in time, wherein $p \neq q$, $1 \leq p \leq M$, $1 \leq q \leq M$, and p and q are integers, and the plurality of partitions comprise a third partition, and the first partition and the second partition are separated by the third partition; and in the target subframe, all of M enabling level pulses in a light-emitting control signal received by a pixel circuit in the third partition do not overlap with the p-th enabling level pulse in the light-emitting control signal received by the pixel circuit in the first partition in time.

20. A display panel, wherein one screen display period of the display panel comprises N subframes, and at least one subframe among the N subframes serves as a target subframe;

the display panel comprises a plurality of partitions arranged along a first direction, the partition comprises at least one pixel circuit; in the target subframe, a light-emitting control signal received by one pixel circuit in the partition comprises M enabling level pulses, wherein M is an integer greater than 1; and the plurality of partitions comprise a first partition and a second partition; in the target subframe, a p-th enabling level pulse in a light-emitting control signal received by a pixel circuit in the first partition at least partially overlaps with a q-th enabling level pulse in a light-emitting control signal received by a pixel circuit in the second partition in time, wherein $p \neq q$, $1 \leq p \leq M$, $1 \leq q \leq M$, and p and q are integers, wherein at least one subframe among the N subframes serves as a fixed target subframe;

in the fixed target subframe, a light-emitting control signal received by a pixel circuit in the partition comprises one enabling level pulse, and a duty ratio of the light-emitting control signal received by the pixel circuit in the partition is less than a first preset threshold; and in the fixed target subframe, the plurality of partitions successively receive the enabling level pulse.

* * * * *